United States Patent
Arai et al.

(10) Patent No.: US 12,411,740 B2
(45) Date of Patent: Sep. 9, 2025

(54) DATA CONTROL APPARATUS AND DATA CONTROL METHOD

(71) Applicant: Hitachi, Ltd., Tokyo (JP)

(72) Inventors: Masahiro Arai, Tokyo (JP); Akira Deguchi, Tokyo (JP); Hideyuki Koseki, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/115,912

(22) Filed: Mar. 1, 2023

(65) Prior Publication Data

US 2024/0020206 A1 Jan. 18, 2024

(30) Foreign Application Priority Data

Jul. 13, 2022 (JP) ................................. 2022-112295

(51) Int. Cl.
 *G06F 11/14* (2006.01)
(52) U.S. Cl.
 CPC ...... *G06F 11/1469* (2013.01); *G06F 11/1451* (2013.01); *G06F 11/1464* (2013.01); *G06F 2201/84* (2013.01)
(58) Field of Classification Search
 CPC ............. G06F 11/1469; G06F 11/1451; G06F 11/1464; G06F 2201/84
 See application file for complete search history.

(56) References Cited

U.S. PATENT DOCUMENTS

| | | | | |
|---|---|---|---|---|
| 8,117,168 | B1* | 2/2012 | Stringham | G06F 11/1458 707/646 |
| 10,838,912 | B1* | 11/2020 | Chopra | G06F 11/1458 |
| 11,086,545 | B1* | 8/2021 | Dayal | G06F 3/067 |
| 2008/0282047 | A1 | 11/2008 | Arakawa et al. | |
| 2013/0185260 | A1* | 7/2013 | Weinstein | G06F 16/1873 707/646 |
| 2014/0081919 | A1 | 3/2014 | Matsumoto et al. | |
| 2015/0081639 | A1* | 3/2015 | Jin | G06F 11/1464 707/644 |
| 2017/0031776 | A1* | 2/2017 | Ren | G06F 11/1451 |
| 2017/0329543 | A1 | 11/2017 | Slater et al. | |

(Continued)

FOREIGN PATENT DOCUMENTS

| | | |
|---|---|---|
| JP | 2004-302857 A | 10/2004 |
| JP | 2007-133664 A | 5/2007 |

(Continued)

OTHER PUBLICATIONS

Japanese Office Action received in corresponding Japanese Application No. 2022-112295 dated Jan. 30, 2024.

*Primary Examiner* — Tony Wu
(74) *Attorney, Agent, or Firm* — MATTINGLY & MALUR, PC

(57) ABSTRACT

In a storage system that is connected via networks to a cloud system, which provides an object store, and backs up backup data of a predetermined volume as an object to the object store, the storage system includes a processor, and the processor is configured to determine whether the storage system stores a snapshot associated with a volume at a first point in time to be restored, and restore the volume at the first point in time using the snapshot when it is determined that the storage system stores the snapshot.

9 Claims, 29 Drawing Sheets

(56) References Cited

U.S. PATENT DOCUMENTS

| | | | |
|---|---|---|---|
| 2020/0167238 A1* | 5/2020 | Killamsetti | G06F 11/1461 |
| 2020/0285410 A1 | 9/2020 | George et al. | |
| 2022/0083427 A1* | 3/2022 | Malamut | G06F 11/1464 |
| 2022/0247766 A1* | 8/2022 | Annen | G06N 20/00 |
| 2022/0391290 A1* | 12/2022 | Geckeler | G06F 21/606 |
| 2023/0266996 A1* | 8/2023 | Reddy | G06F 9/5072 |
| | | | 718/105 |

FOREIGN PATENT DOCUMENTS

| | | |
|---|---|---|
| JP | 2008-282382 A | 11/2008 |
| JP | 2015-529861 A | 10/2015 |

\* cited by examiner

FIG. 7

| Volume LBA | P-VOL ADR | SS01 ADR | SS02 ADR |
|---|---|---|---|
| #1 | B03 | B00 | B03 |
| #2 | B04 | B01 | B01 |
| #3 | B02 | B02 | B02 |
| ... | .. | ... | ... |

401 402 403 404

400

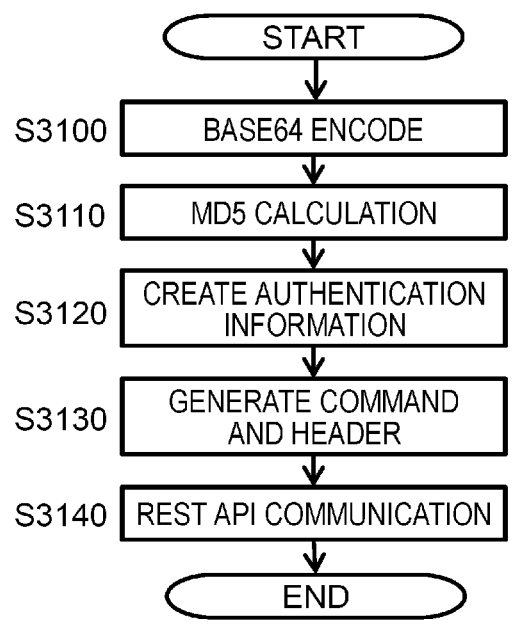

OBJ Key: VSP56342-v7f-s02.meta

| Bitmap Size | 400,000,000B |
|---|---|
| Bitmap | 11001101110110110101110111110100000010101010110101101010101011101010110b..... |
| Data OBJKey0 | VP56342-v7f-s02-obj001.dat |
| Length | 64,64,64,64,64,64,... |
| Data OBJKey1 | VSP56342-v7f-s02-obj002.dat |
| Length | ... |
| Data OBJKey2 | ... |
| Length | ... |

VSP564342-v7f-s02.catalog ~C24

| APPARATUS PRODUCT NUMBER | VSP56342 | T1610 |
| --- | --- | --- |
| BACKUP VOLUME NUMBER | 0x7f | T1611 |
| Volume USAGE/PROVISIONING SIZE | 12.8TB/16.0TB | T1612 |
| Snapshot GENERATION NUMBER | 02 | T1613 |
| Snapshot ACQUISITION DATE AND TIME | 2021-04-28 21:00:17 | T1614 |
| METADATA OBJ Key | VSP56342-v7f-s02.meta | T1615 |
| PARENT CATALOG OBJ Key | VSP56342-v7f-s01.catalog | T1616 |

FIG. 16B

VSP56342-v7f-s01.catalog ~C23

| APPARATUS PRODUCT NUMBER | VSP56342 | T1710 |
| --- | --- | --- |
| BACKUP Volume NUMBER | 0x7f | T1711 |
| Volume ACTUAL USAGE/PROVISIONING SIZE | 11.5TB/16.0TB | T1712 |
| Snapshot GENERATION NUMBER | 01 | T1713 |
| Snapshot ACQUISITION DATE AND TIME | 2021-04-28 18:00:14 | T1714 |
| METADATA OBJ Key | VSP56342-v7f-s01.meta | T1715 |
| PARENT CATALOG OBJ Key | - | T1716 |

FIG. 23

| Key | APPARATUS PRODUCT NUMBER | BACKUP VOLUME NUMBER | Volume USAGE / PROVISIONING SIZE | Snapshot GENERATION NUMBER | Snapshot ACQUISITION DATE AND TIME | METADATA OBJ Key | PARENT CATALOG Key |
|---|---|---|---|---|---|---|---|
| VSP56342-v7f-s01 | VSP56342 | 0x7f | (12.8, 16.0) | 01 | 2021-04-28 18:00:14 | VSP56342-v7f-s01.meta | (null) |
| VSP56342-v7f-s02 | VSP56342 | 0x7f | (12.8, 16.0) | 02 | 2021-04-28 21:00:17 | VSP56342-v7f-s02.meta | VSP56342-v7f-s01 |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

```
BACKUP SETTING         D301
▼  Select Volumes
   ☐ #12: VolA-01(2TB)
   ☐ #13: VolA-02(32TB)
   ☑ #7F: VolB(16TB)
   ☐ #90: VolC(8TB)

▼  Select Object Store   D302
   [ ams: std Backup              ▼ ]

▼  Backup Schedule   D303
   ○ One shot   D3031
      ○ Now    ○ [ 00:00 ]
   ● Periodically   D3032
      ● Daily     Start At  [ 00:00 ]
      ○ Weekly   ☑ Every   [ 30 ]  minutes
      ○ Monthly  ☐ Max.    [ 47 ]  times ▼  Backup Policy   D305
   ● Time-based   D3051
   ○ Cost-based   D3052
                                 D3053
                  Threshold  [ 2.0 ] x ▼  Deletion Policy   D306
   ○ Delete Old Backup set   D3061
   ○ Archive Old Backup set  D3062
                              D311      D312
                           [  OK  ]  [ Cacnel ]
```

D31

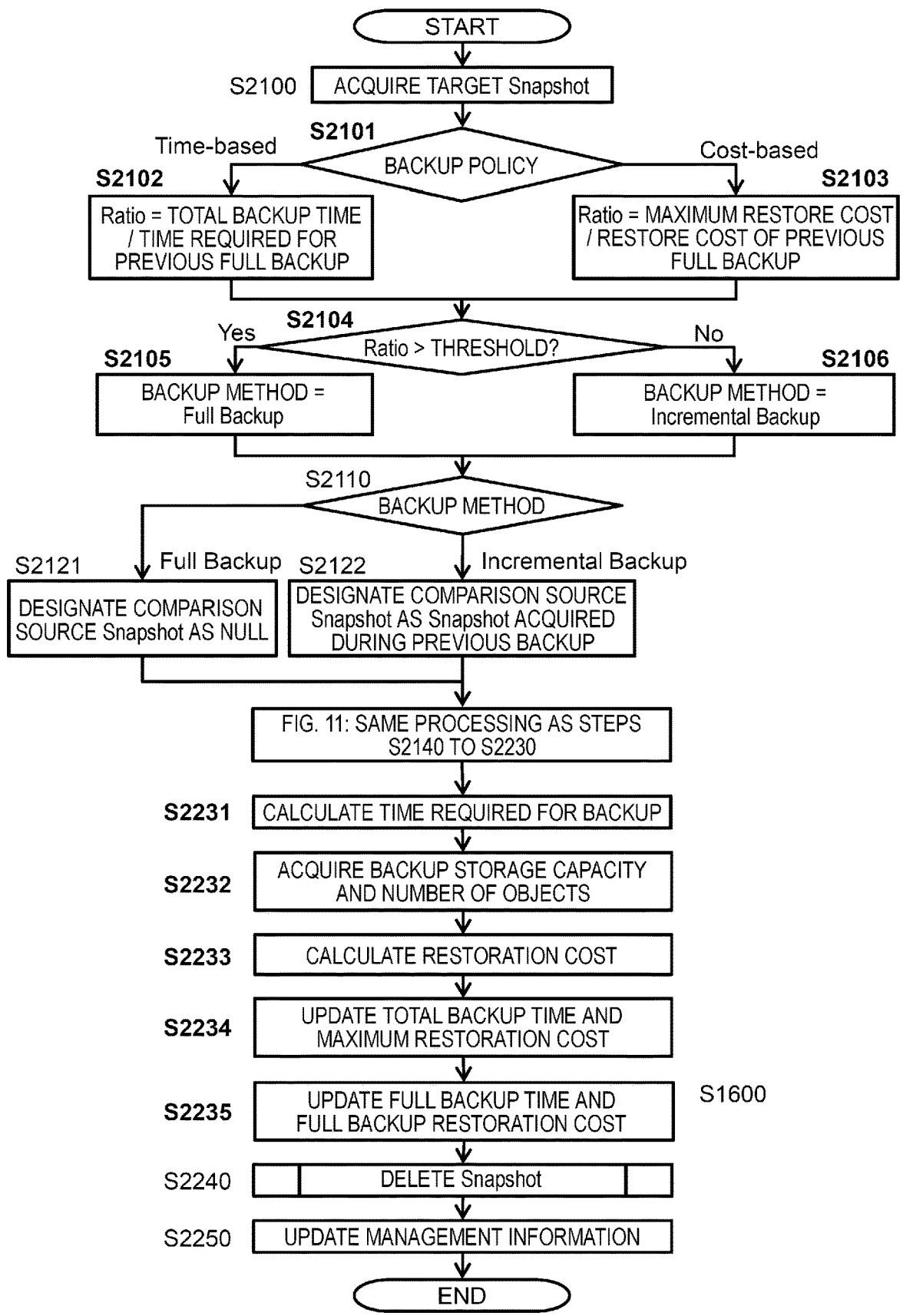

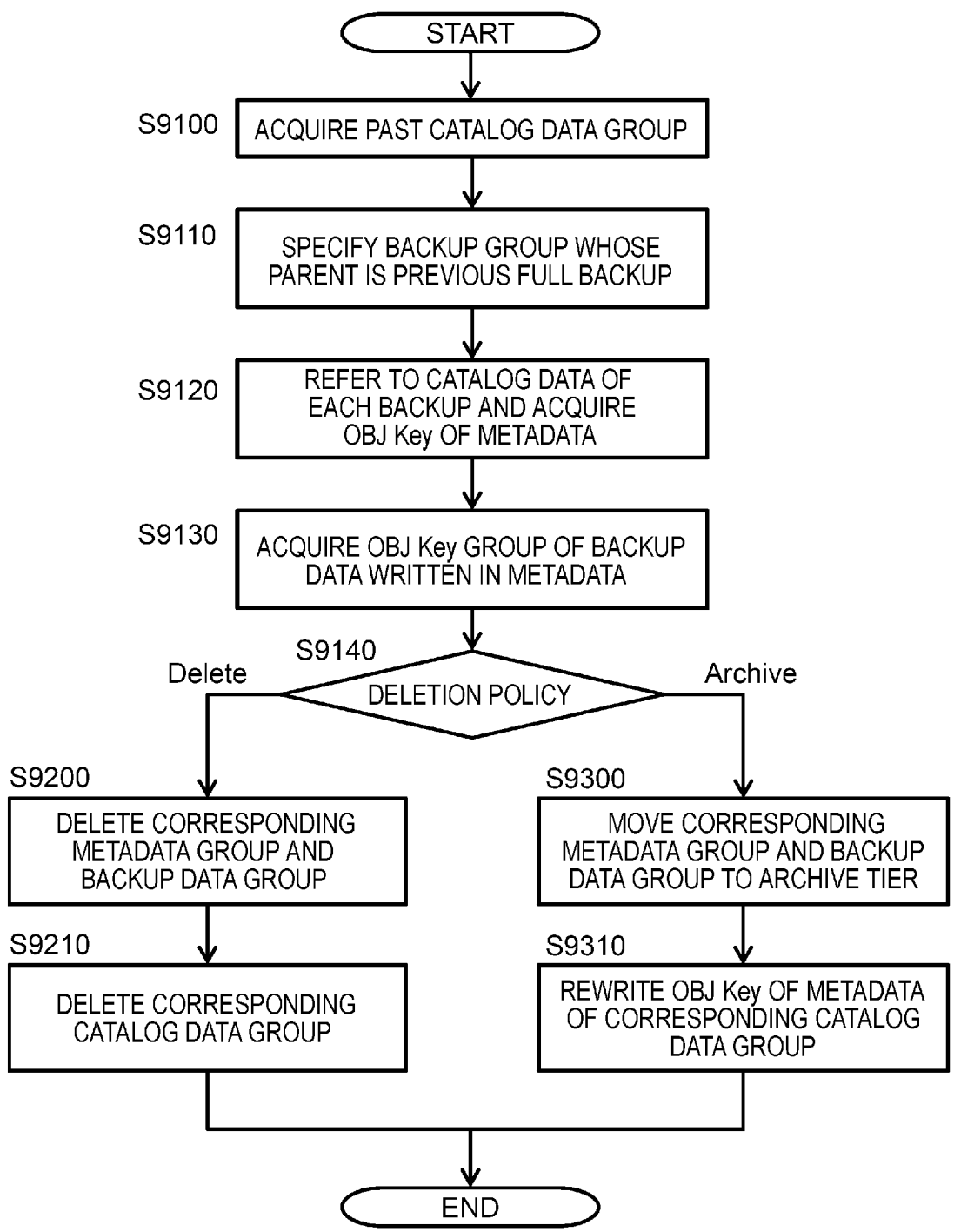

DATA CONTROL APPARATUS AND DATA CONTROL METHOD

CROSS-REFERENCE TO RELATED APPLICATION

The present application claims priority from Japanese application JP2022-112295, filed on Jul. 13, 2022, the contents of which is hereby incorporated by reference into this application.

BACKGROUND OF THE INVENTION

1. Field of the Invention

The present invention relates to a technology for restoring a predetermined volume.

2. Description of Related Art

In recent years, an operation form called hybrid cloud has emerged, in which on-premise IT assets and public cloud services are used in combination according to cost and usage. In terms of storage, an on-premise apparatus has high speed I/O access, but has a high bit cost and also requires prior capacity design. In contrast, cloud services are characterized in that performance thereof is limited by distance and communication bandwidth, but the bit cost is low and capacity design is not required.

A representative service in the cloud services is an object store service that stores data in an object format and accesses it using REST API. Since an object store can use an almost unlimited capacity, the object store does not require prior capacity design, and is characterized by lower bit costs than other cloud storage services.

As a method for using the object store, a method for using it as a backup of an on-premise storage apparatus is considered. For example, US2020/0285410A discloses a method in which target data is obtained from a difference between first and second snapshots for using a snapshot technology, data deduplication is performed by comparing the target data with a transferred block, and data including a plurality of deduplicated blocks is transferred as an object.

When restoring a volume using data backed up to a cloud, for example, there are the following problems. In order to restore data using backup data obtained by backing up increments of data, it is necessary to acquire backup data one by one in order from the oldest generation and restore data using the backup data. This is because when the increments are backed up, the data that has been backed up once is not included in backup data of other generations.

When backup is continued in this way, 100 generations of data are accumulated, for example, at the 100th backup, these data should be acquired and restored in order during restoration, an amount of data to be transferred increases, an amount of process up to restoration increases, and the process time increases. In contrast, US2020/0285410A does not disclose any method for restoring data.

SUMMARY OF THE INVENTION

The present invention has been made in view of the circumstances described above, and an object thereof is to provide a technology that can easily and appropriately restore a volume.

In order to achieve the object described above, a data control apparatus according to one aspect is a data control apparatus that is connected via a network to a cloud system, which provides an object store, and backs up backup data of a predetermined volume as an object to the object store, the data control apparatus includes a processor, and the processor determines whether the data control apparatus stores a snapshot associated with a volume at a first point in time to be restored and restores the volume at the first point in time using the snapshot when it is determined that the data control apparatus stores the snapshot.

According to the present invention, the volume can be restored easily and appropriately.

BRIEF DESCRIPTION OF THE DRAWINGS

FIG. 7 is a configuration diagram of a mapping table according to the first embodiment;

FIG. 13 is a flowchart of an object conversion and transmission process according to the first embodiment;

FIG. 15 is a configuration diagram of metadata according to the first embodiment;

FIG. 16A is a first example of catalog data according to the first embodiment;

FIG. 16B is a second example of catalog data according to the first embodiment;

FIG. 23 is a configuration diagram of a catalog data table according to a modification of the first embodiment;

FIG. 24 is a diagram illustrating a backup schedule setting screen according to a second embodiment;

FIG. 25 is a flowchart of a backup process according to the second embodiment; and FIG. 26 is a flowchart of an old backup set disposal process according to the second embodiment.

DESCRIPTION OF EMBODIMENTS

Several embodiments are described with reference to the drawings. It should be noted that the embodiments described below do not limit the invention according to the claims, and that all of the elements described in the embodiments and combinations thereof are not necessarily essential to the solution of the invention.

First, a computer system according to a first embodiment is described.

Figure 1:
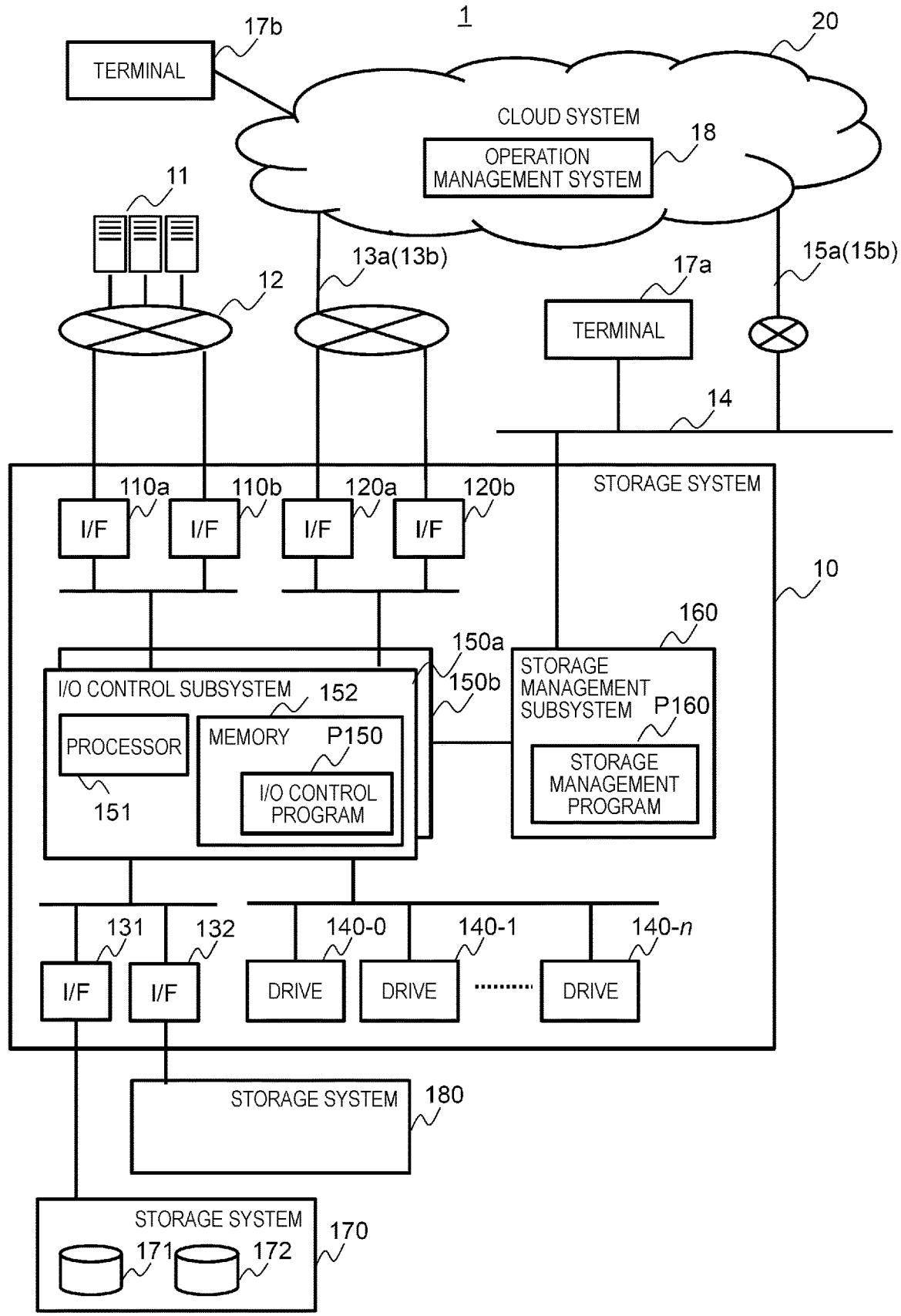
FIG. 1 is an overall configuration diagram of a computer system according to a first embodiment.

FIG. 1 is an overall configuration diagram of a computer system according to the first embodiment.

A computer system 1 includes a storage system 10 as an example of a data control apparatus, a cloud system 20, a server group 11, a terminal 17a, a terminal 17b, and the like.

The terminal 17b and the cloud system 20 are connected to each other via a network. The server group 11 and the storage system 10 are connected to each other via a storage network 12. The storage system 10 and the cloud system 20 are connected to each other via a dedicated line 13a or an Internet line 13b. The storage system 10 and the terminal 17a are connected to each other via a local area network (LAN) 14. The storage system 10 and the terminal 17a are connected to the cloud system 20 via the LAN 14 and a dedicated line 15a or an Internet line 15b.

The cloud system 20 provides various services to the storage system 10 and the like. The cloud system 20 includes an operation management system 18 that manages operation of a plurality of storage systems including the storage system 10. The operation management system 18 performs a process for managing the operation of the storage system 10.

The terminal 17b receives an input of a management instruction for the storage system from an administrator who manages a plurality of storage systems 10, and transmits the management instruction to the operation management system 18.

The terminal 17a receives an operation instruction from an operator who operates the storage system 10 and transmits the operation instruction to the storage system 10.

The server group 11 performs read and write input/output (I/O) with respect to a logical volume provided by the storage system 10 and executes various processes.

The storage system 10 is, for example, a disk array apparatus that provides data protection by redundant array of independent (or inexpensive) disks (RAID), data copy functions inside and outside the storage system, and like.

The storage system 10 includes a plurality of redundant I/O control subsystems 150 (150a and 150b), a storage management subsystem 160, a plurality of host interfaces (I/F) 110a and 110b, network interfaces 120a and 120b, connection interfaces 131 and 132, and a plurality of drives 140 (140-0, 140-1, . . . , 140-n).

The host interfaces 110a and 110b communicate with the server group 11 via the storage network 12.

The network interfaces 120a and 120b perform communication related to various cloud services provided by the cloud system 20 via the dedicated line 13a or the Internet line 13b.

The connection interfaces 131 and 132 can be connected to other storage systems 170 and 180, and perform communication with the connected storage systems. For example, the storage system 10 can control logical volumes 171 and 172 provided by the connected storage system 170 like its own logical volumes. In addition, the storage system 10 can execute a copy of the volume between the storage system 10 and the connected storage system 180.

The drives 140 are physical storage apparatuses such as solid state drives (SSDs) and hard disk drives (HDDs).

The I/O control subsystem 150 constructs one or more logical volumes based on storage areas of the connected drives 140 and provides the logical volumes to the server group 11. Based on the read and write I/O from the server group 11, the I/O control subsystem 150 issues read and write I/O to the drives 140 and executes I/O processing.

The I/O control subsystem 150 includes a processor 151 and a memory 152. The processor 151 executes various processes according to a program stored in the memory 152.

The memory 152 is, for example, a random access memory (RAM), and stores a program executed by the processor 151 and necessary information. The memory 152 stores an I/O control program P150.

The storage management subsystem 160 executes a process for performing various settings and monitoring of the storage system 10. The storage management subsystem 160 receives an instruction from the operator from the terminal 17a via the LAN 14. The storage management subsystem 160 stores a storage management program P160, and performs various processes by executing the storage management program P160 by an internal processor. The storage management subsystem 160 also receives an instruction from the operation management system 18 operating on the cloud system 20 via the dedicated line 15a or the Internet line 15b, and executes a process according to the instruction. In the example in FIG. 1, although the storage management subsystem 160 is provided inside the storage system 10, the storage management subsystem 160 may be provided outside the storage system 10, and a portion of the storage management subsystem 160 may be operated on the cloud system 20.

Next, the cloud system 20 is described.

Figure 2:
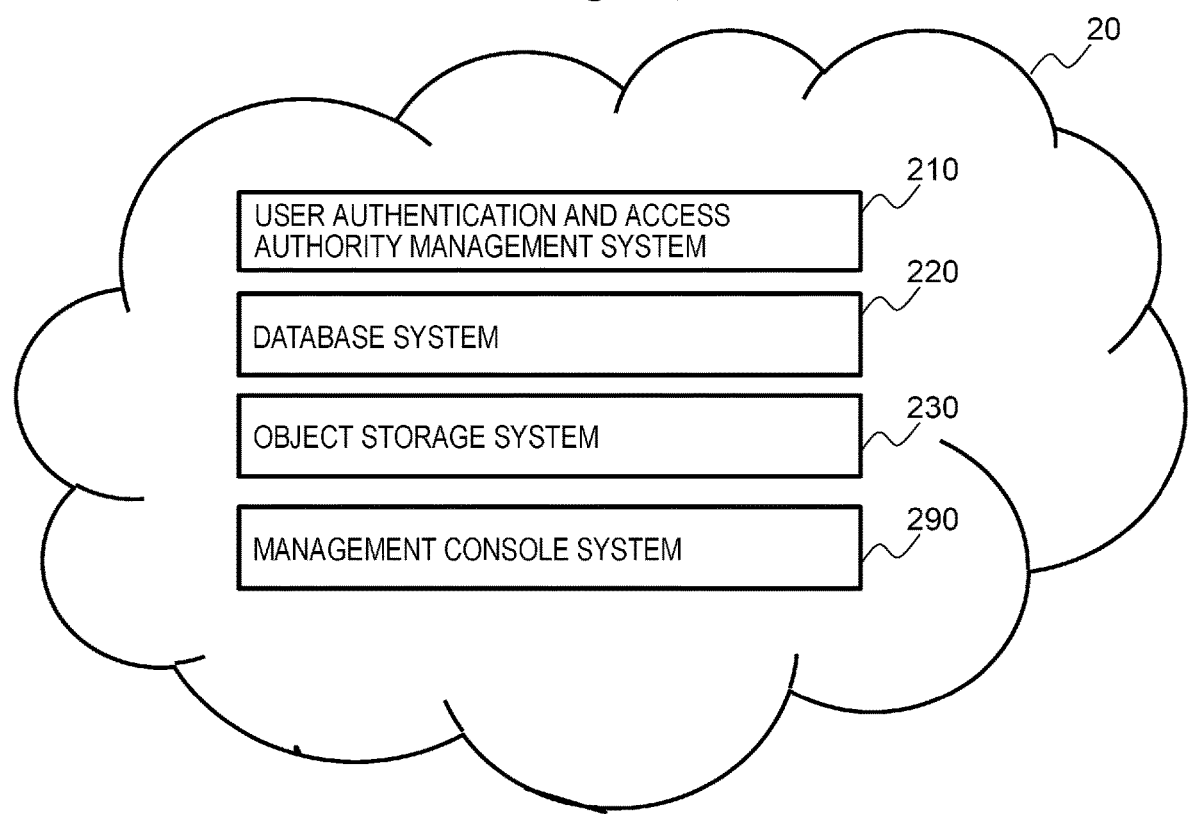
FIG. 2 is a configuration diagram of a cloud system according to the first embodiment.

FIG. 2 is a configuration diagram of a cloud system according to the first embodiment.

The cloud system 20 is configured with a plurality of servers and the like, and provides various microservices such as data store services, computing services, and application services. The cloud system 20 includes a user authentication and access authority management system 210, a database system 220, an object storage system 230, and a management console system 290.

The user authentication and access authority management system 210 provides user authentication and access authority management services. The user authentication and access authority management system 210 issues an access ID and a secret key for each user who uses various services according to an instruction from a service contractor of the cloud system 20. The user authentication and access authority management system 210 also defines authority to the access ID and an access permission policy for each service resource. The user authentication and access authority management system 210 controls access of users and access to various services.

The database system 220 provides an SQL database and a NoSQL database.

The object storage system 230 provides an object store that constitutes an unlimited capacity storage for which object groups can be read and written using REST API.

The management console system 290 provides a console service for starting/stopping use of various services and displaying a use status. For example, a contractor can access the user authentication and access authority management system 210 through the console service of the management console system 290 to create an access ID of a user or check a use capacity of the object store service.

Next, the I/O control program P150 stored and executed in the I/O control subsystem 150 of the storage system 10 is described.

Figure 3:
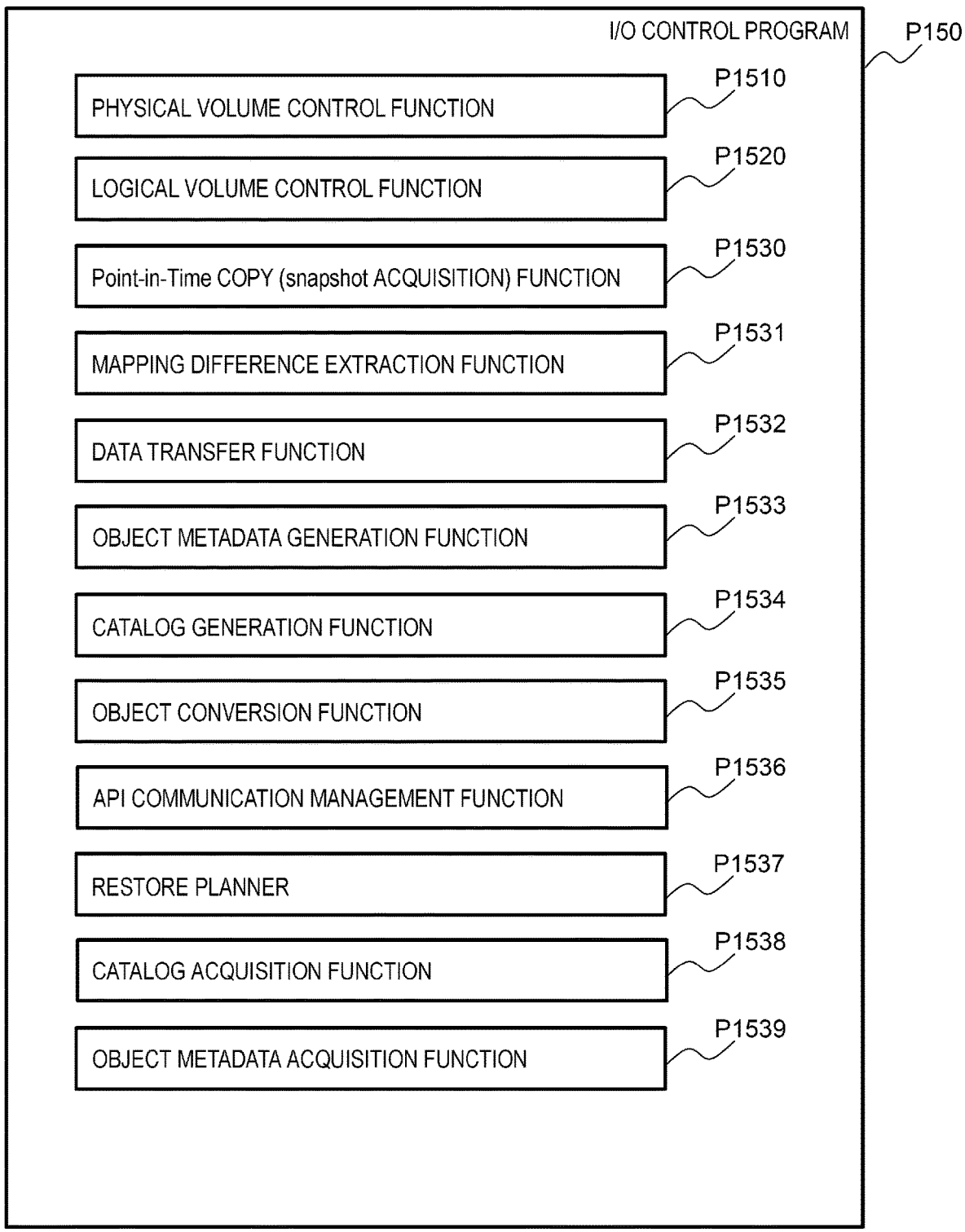
FIG. 3 is a configuration diagram of an I/O control program according to the first embodiment.

FIG. 3 is a configuration diagram of an I/O control program according to the first embodiment.

The I/O control program P150 includes a physical volume control function P1510, a logical volume control function P1520, a Point-in-Time copy (snapshot acquisition) function P1530, a mapping difference extraction function P1531, a data transfer function P1532, an object metadata generation function P1533, a catalog generation function P1534, an object conversion function P1535, an API communication management function P1536, a restore planner P1537, a catalog acquisition function P1538, and an object metadata acquisition function P1539.

The physical volume control function P1510 is a function for controlling the plurality of drives 140, and performs drive I/O control including a failure process of drive paths and drives themselves.

The logical volume control function P1520 constructs the logical volume through a capacity virtualization mechanism, and performs host I/O control and data copying.

The Point-in-Time copy function P1530 is a function that copies and stores a static image (called a snapshot) of the logical volume in cooperation with the logical volume control function P1520. The Point-in-Time copy function P1530 also has a function to copy back the stored snapshot to an original volume.

The mapping difference extraction function P1531 acquires a difference between mapping data of the snapshots.

The data transfer function P1532 copies data to and from the memories and buffers of the network interfaces 120a and 120b.

The object metadata generation function P1533 generates metadata (meta information) including a correspondence relation between location information within an object and address information of a block on the logical volume.

The catalog generation function P1534 creates catalog data (catalog information) holding various information of backup for each generation.

The object conversion function P1535 performs mutual conversion between binary format data held in the storage system 10 and object format data to be transmitted using REST API.

The API communication management function P1536 executes a communication process by REST API with the cloud system 20 via the network interface 120, and also executes various recovery processes related to communication when an error occurs.

The restore planner P1537 plans a procedure when restoring data from the cloud system 20 by referring to a plurality of pieces of catalog data and snapshots held by the storage system 10.

The catalog acquisition function P1538, during restoration of the volume, acquires catalog data from the object store of the cloud system 20 and interprets the contents of the acquired catalog data.

The object metadata acquisition function P1539, during the restoration, acquires metadata from the object store of the cloud system 20 and interprets the contents of the acquired metadata.

Next, the storage management program P160 stored and executed in the storage management subsystem 160 of the storage system 10 is described.

Figure 4:
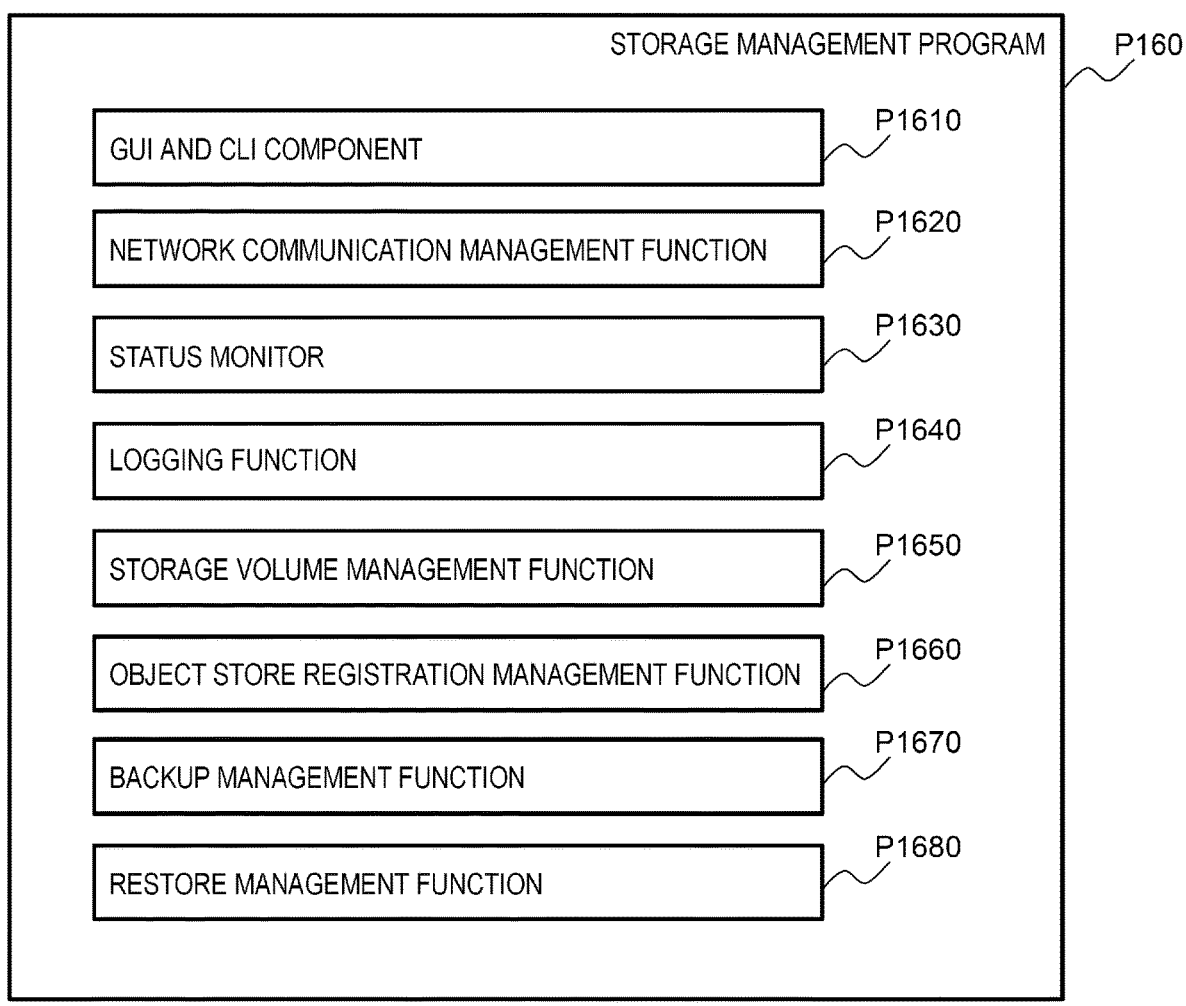
FIG. 4 is a configuration diagram of a storage management program according to the first embodiment.

FIG. 4 is a configuration diagram of a storage management program according to the first embodiment.

The storage management program P160 includes a graphical user interface (GUI) and command line interface (CLI) component P1610, a network communication management function P1620, a status monitor P1630, a logging function P1640, a storage volume management function P1650, an object store registration management function P1660, a backup management function P1670, and a restore management function P1680.

The GUI and CLI component P1610 provides a user interface that enables management functions of the storage management program P160 to be used from the terminals 17a and 17b and the operation management system 18. The GUI and CLI component P1610 provides, for example, an object store registration screen, a backup setting screen, and the like.

The network communication management function P1620 manages settings of the network interface 120 for connecting with the cloud system 20 and network settings for connecting to the LAN 14. The network communication management function P1620 sets, for example, an IP address, netmask, gateway, and the like of the network interface 120.

The status monitor P1630 displays a health status of hardware provided in the storage system 10, a use capacity and health status of each logical volume and object store, progress of a process being executed, an I/O speed, and the like.

The logging function P1640 records logs of various processes. The logging function P1640 records, for example, the start/end of the backup process, an error, and the like.

The storage volume management function P1650 constructs and manages the plurality of drives 140, a storage pool consisting of storage areas of the plurality of drives 140, and the logical volume created by the storage areas of the storage pool. The storage pool will be described later with reference to FIG. 5A.

The object store registration management function P1660 registers and manages information about the object store service of the cloud system 20 that the storage system 10 uses.

The backup management function P1670 manages settings for backup (backup settings) to the cloud system 20. The restore management function P1680 instructs restoration of data backed up in the cloud system 20.

A configuration of the logical volumes in the storage system 10 is described.

Figure 5A:
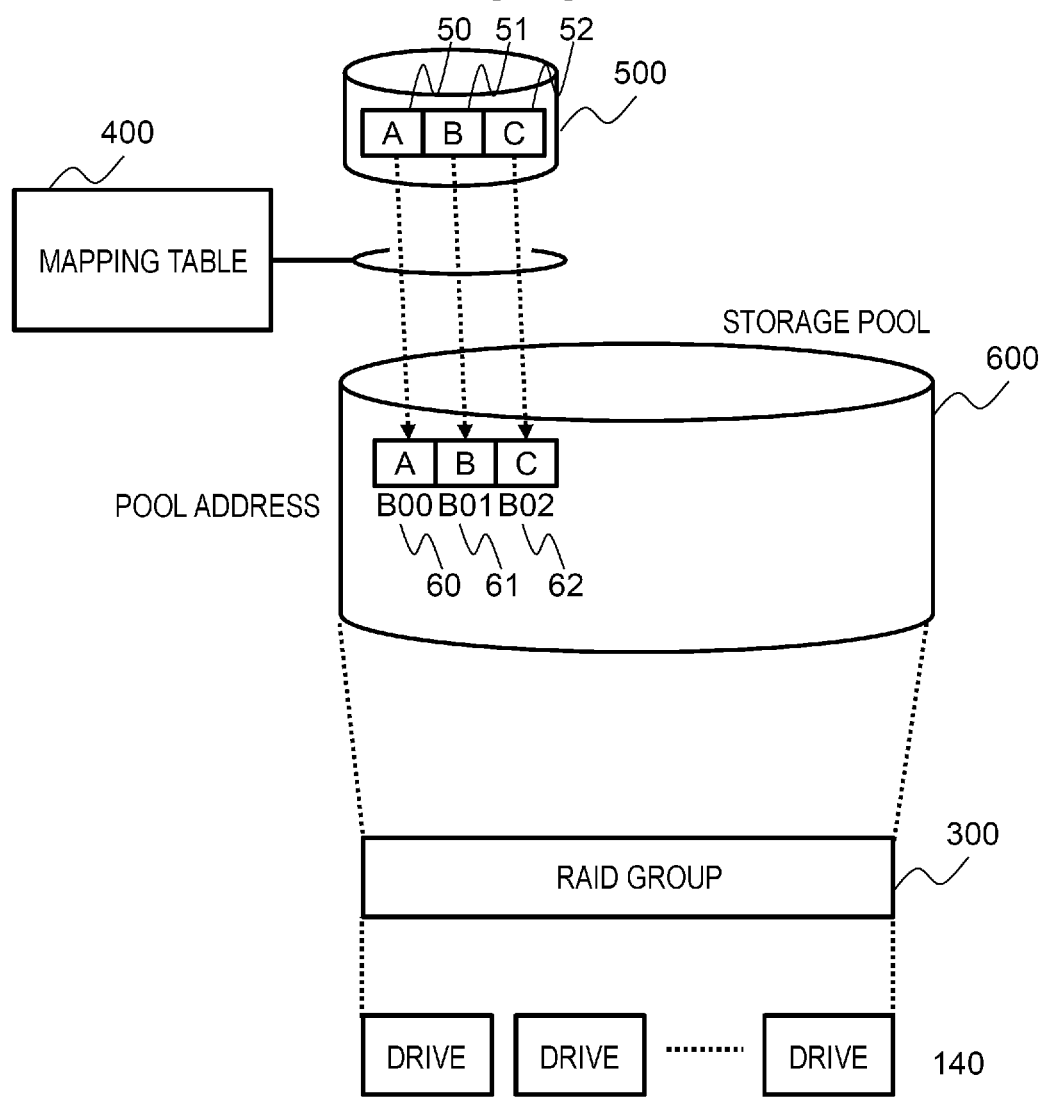
FIG. 5A is a diagram for describing a configuration of a logical volume according to the first embodiment.

FIG. 5A is a diagram for describing a configuration of the logical volume according to the first embodiment.

In the storage system 10, a RAID group 300 for data protection using RAID is configured with the plurality of drives 140. Data to be written to the RAID group 300 is distributed and stored in the plurality of drives 140 through predetermined calculations according to RAID 5, for example.

Since the RAID group 300 is configured with the plurality of drives 140, it generally has a large capacity. Therefore, in the storage system 10, a logical management mechanism called a storage pool 600 is defined to manage the capacity of the RAID group 300. The storage pool 600 is managed by dividing a storage area into a plurality of blocks with a predetermined block size and assigning a logical address (pool address) on the storage pool 600 to each block. The storage pool 600 may be configured with a plurality of RAID groups. The storage system 10 may include a plurality of storage pools.

A logical volume 500 is a virtual device configured in association with the capacity of the storage pool 600 managed by the capacity virtualization (thin provisioning) technology. Since the logical volume 500 has no entity, when a host writes data to the logical volume 500, the storage system 10 temporarily stores data in the memory on the I/O control subsystem 150, then allocates a portion of the blocks of the storage pool 600 to virtual blocks of the logical volume 500, and stores the data in those blocks. The mapping table 400 manages the correspondence relation between the virtual blocks of the logical volume 500 and the blocks on the storage pool 600. The mapping table 400 is stored, for example, in the memory within the storage management subsystem 160.

FIG. 5A illustrates an example in which, for the logical volume 500, three data units 'A', 'B', and 'C' are sequentially written to virtual blocks 50, 51, and 52. In this example, as indicated by dotted arrows in the figure, blocks 60, 61, and 62 corresponding to pool addresses B00, B01, and B02 of the storage pool 600 are assigned to the virtual blocks 50, 51, and 52, and the three data units are stored in the blocks 60, 61, and 62. In this case, the correspondence relation between addresses of the virtual blocks 50, 51, and 52 of the logical volume 500 and the pool addresses of the blocks 60, 61, and 62 of the storage pool 600 is recorded in the mapping table 400.

Next, an operation of updating data of the logical volume 500 is described.

Figure 5B:
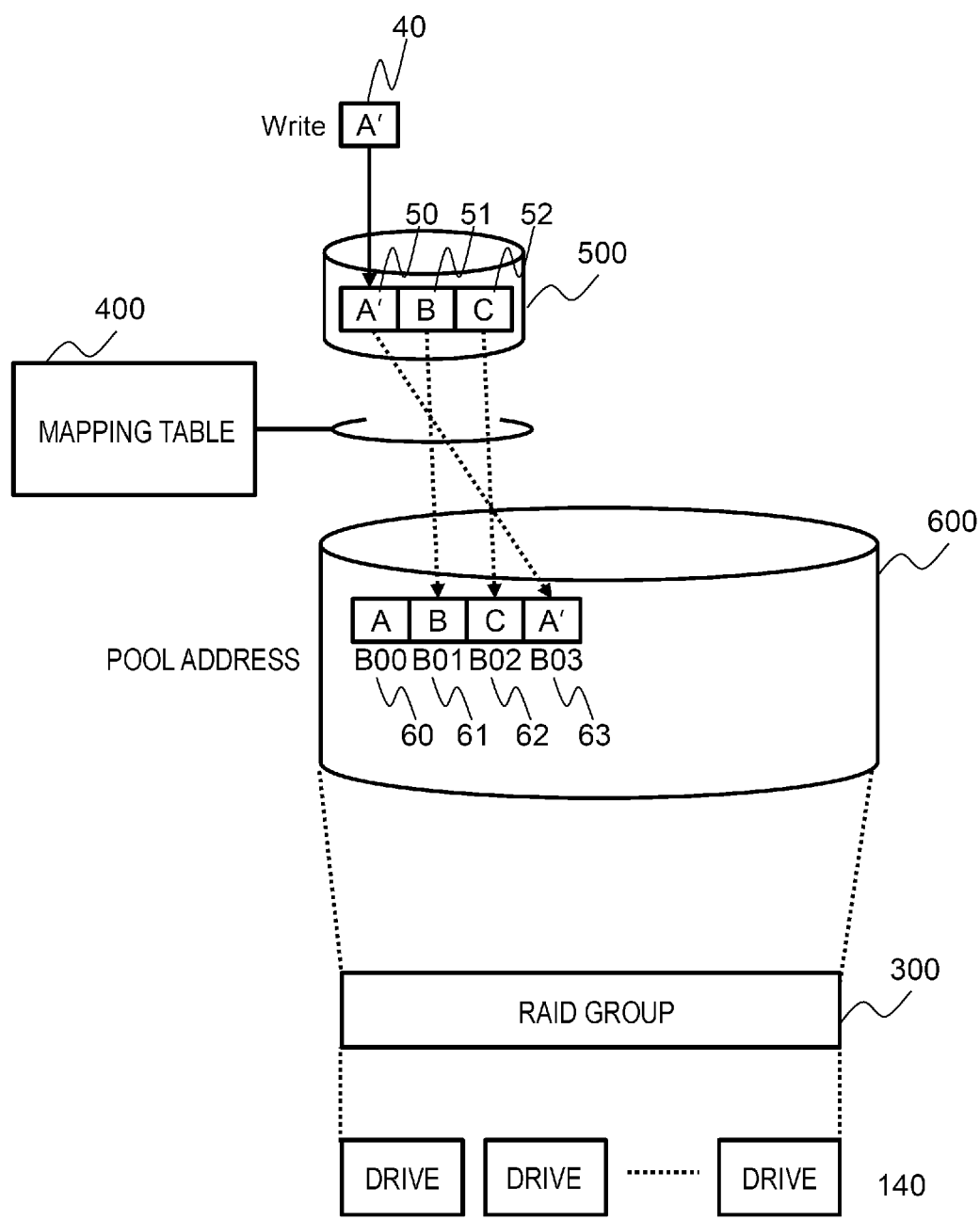
FIG. 5B is a diagram for describing update of the logical volume according to the first embodiment.

FIG. 5B is a diagram for describing update of the logical volume according to the first embodiment. FIG. 5B illustrates an example in which the host (for example, one of servers in the server group 11) overwrites the virtual block 50 of the logical volume 500 illustrated in FIG. 5A with a new data unit 40 "A'".

When a new data unit 40 for the virtual block 50 is received from the host, the storage system 10 secures a new block 63 (pool address B03) in the storage pool 600 and writes the data unit to the secured block 63. Next, the storage system 10 correlates the address of the virtual block 50 with the pool address B03 of the newly secured block 63 in the mapping table 400. Since the block 60 that was correlated with the virtual block 50 is no longer referenced anywhere, the block 60 is determined to be an unused block, and is collected (set as a free block) and reused at an appropriate timing by the storage volume management function P1650.

Next, acquisition of a snapshot for the logical volume 500 is described.

Figure 6:
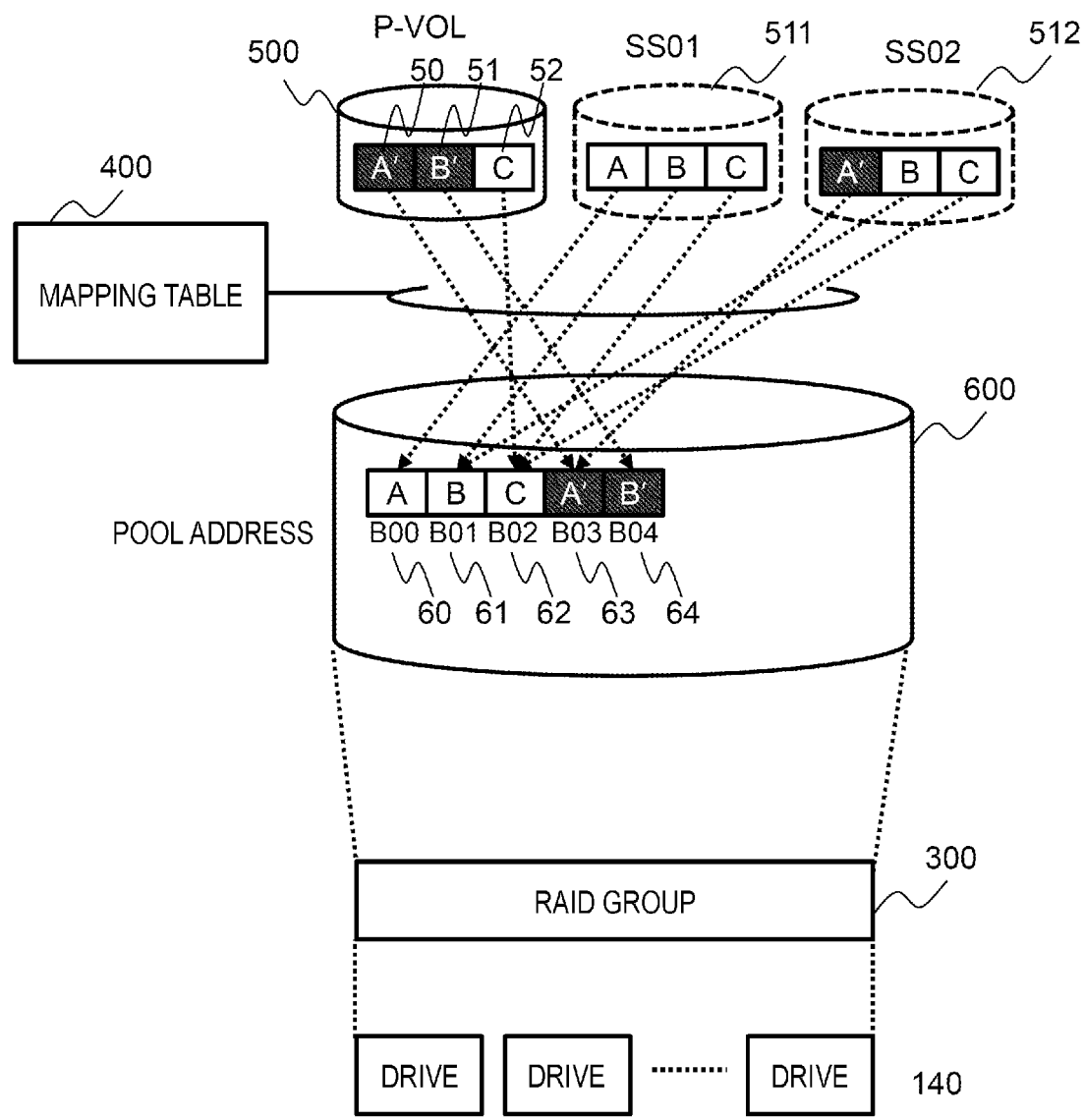
FIG. 6 is a diagram for describing acquisition of a snapshot of the logical volume according to the first embodiment.

FIG. 6 is a diagram illustrating acquisition of a snapshot of the logical volume according to the first embodiment. FIG. 6 illustrates an example of acquiring snapshots at several points in time in the process for updating the logical volume 500 illustrated in FIG. 5A.

When a snapshot is taken at the point in time when the logical volume 500 (P-VOL) is in the state illustrated in FIG. 5A, the acquired snapshot becomes a snapshot 511 (SS01). Here, the snapshot is a virtual copy of the logical volume at a certain point in time.

The snapshot 511 indicates that data units of the logical volume 500 at the point in time illustrated in FIG. 5A are "A", "B", and "C", and is created by copying information of the logical volume of the mapping table 400. Specifically, the snapshot 511 includes information on the correspondence relation between the addresses of the virtual blocks 50, 51, and 52 and the pool addresses B00, B01, and B02 of the blocks 60, 61, and 62 of the storage pool 600. In this embodiment, the storage system 10 registers the snapshot 511 in the mapping table 400.

After that, when a head data unit of the logical volume 500 is rewritten from "A" to "A'" and a snapshot is acquired at the point in time of that state, the acquired snapshot becomes a snapshot 512 (SS02). The snapshot 512 indicates that the data units of the logical volume 500 at that point in time are "A'", "B", and "C", and is created by copying information of the logical volume 500 of the mapping table 400 at that point in time. Specifically, the snapshot 512 includes information on the correspondence relation between the addresses of the virtual blocks 50, 51, and 52 and the pool addresses B03, B01, and B02 of the blocks 63, 61, and 62 in which data units "A'", "B", and "C" of the storage pool 600 are stored. In this embodiment, the storage system 10 registers the snapshot 512 in the mapping table 400.

After that, when the second data unit of the logical volume 500 is overwritten from "B" to "B'", a new block 64 (pool address B04) of the storage pool 600 is secured by the operation illustrated in FIG. 5B, the data unit "B'" is written to the secured block 64, and, in the mapping table 400, the pool address B04 of the newly secured block 64 is correlated with a second address of the virtual block 50.

According to the snapshots 511 and 512, the correspondence relation between the virtual blocks corresponding to the logical volume 500 at the point in time in the past when the snapshot was acquired and the blocks of the storage pool 600 can be specified, and the logical volume 500 at that point in time can be restored by acquiring data units from identifiable blocks of the storage pool 600.

Next, the mapping table 400 is described.

FIG. 7 is a configuration diagram of a mapping table according to the first embodiment. The mapping table in FIG. 7 is a mapping table when the logical volume 500 and the snapshots 511 and 512 are in the state illustrated in FIG. 6.

The mapping table 400 includes a column 401 indicating virtual block addresses (LBA) of the logical volume 500, a column 402 indicating the pool addresses of the blocks of the storage pool 600 each of which corresponds to each of the virtual blocks of the logical volume 500, and columns 403 and 404 corresponding to the snapshots 511 and 512 of the logical volume 500.

In the column 402 corresponding to the logical volume 500, since the data units stored in the logical volume 500 are "A'", "B'", and "C" as illustrated in FIGS. 6, B03, B04, and B02, ..., which are the pool addresses of the blocks of the storage pool 600 where these data units are stored, are stored.

Since the column 403 corresponding to the snapshots corresponds to the state at the point in time when the data units of the logical volume 500 were "A", "B", and "C", B00, B01, and B02, ..., which are the pool addresses of the blocks of the storage pool 600 where these data units are stored, are stored.

Since the column 404 corresponding to the snapshots corresponds to the state at the point in time when the data units of the logical volume 500 were "A", "B", and "C", B03, B01, and B02, ..., which are the pool addresses of the blocks of the storage pool 600 where these data units are stored, are stored.

Here, in the storage system 10, the blocks of the storage pool 600 that are registered (referenced) in the mapping table 400 are not determined to be unused blocks, and the data units stored in those blocks are maintained in the stored state. Therefore, the blocks B00 to B04 of the storage pool 600 referenced in the mapping table 400 are not determined as unused blocks, and the data units "A", "B", "C", "A'", and "B'" of the blocks are maintained in the stored state.

Next, a backup process to the cloud system 20 using snapshots is described.

First, screens related to registration of the object store of the cloud system 20 in the storage system 10 are described.

Figures 8A, 8B:
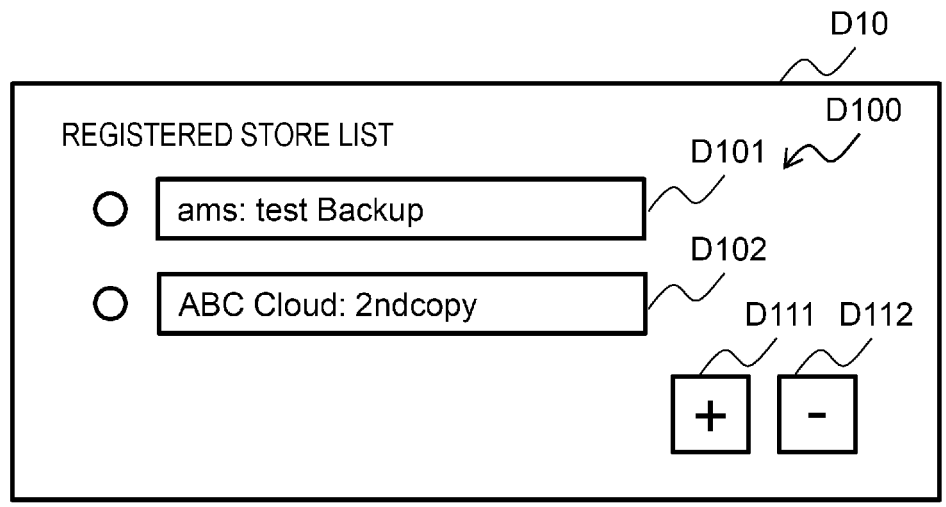
FIG. 8A is a diagram illustrating a registration store screen according to the first embodiment.
FIG. 8B is a diagram illustrating a new store registration screen according to the first embodiment.

FIG. 8A is a diagram illustrating a registration store screen according to the first embodiment. A registration store screen D10 is provided to the terminals 17a, 17b, and the like by the object store registration management function P1660 and the GUI and CLI component P1610.

The registration store screen D10 is, for example, a screen first displayed on a terminal of a request source when the storage system 10 receives a request to perform store registration.

The registration store screen D10 includes a registered store list display area D100, an add button D111, and a delete button D112.

The registered store list display area D100 is an area for displaying a list of already registered object stores (object store list), and includes registered store selection areas D101, D102, and the like in which the registered object stores are displayed so as to be selectable.

The add button D111 is a button for receiving an instruction to add a new object store or edit a selected object store. When the add button D111 is pressed while no object store is selected in the registered store list display area D100, the storage system 10 causes a new store registration screen D20 to be displayed (see FIG. 8B). When the add button D111 is pressed while an object store is selected in the registered store list display area D100, the storage system 10 causes a screen for editing the selected object store to be displayed.

The delete button D112 is a button for receiving deletion of the object store selected in the registered store list display area D100. When the delete button D112 is pressed, the storage system 10 performs a process for deleting the selected object store.

FIG. 8B is a diagram illustrating the new store registration screen according to the first embodiment.

The new store registration screen D20 has a dropdown box D201, a Tag button D211, an OK button D212, and a Cancel button D213. In the dropdown box D201, a cloud service available in the storage system 10 can be selected.

When the cloud service is selected in the dropdown box D201, the storage system 10 displays a setting area where input and selection can be made according to the selected cloud service. For example, when an object store is selected in the dropdown box D201, a name setting area D207, a region selection area D202, an access ID input area D203, a secret key input area D204, a bucket name setting area D205, and an encryption selection area D206 are displayed, as setting areas, on the new store registration screen D20.

The name setting area D207 is an area for designating a registration name for the object store to be created. This registration name is used, for example, when displaying in an object store list. The region selection area D202 is, for example, a dropdown box, and is an area where a cloud service usage area can be selected. The access ID input area D203 is an area for inputting an access ID necessary for accessing the object store to be registered. The secret key input area D204 is an area for inputting a secret key necessary for accessing the object store to be registered. The bucket name setting area D205 is an area for designating a name of a bucket (bucket name) in which backup data is stored on the object store to be registered. The bucket name should be a unique name in the region. For this reason, the storage system 10 generates the bucket name using unique information that does not overlap with other users, such as a manufacturing number of the storage system 10 and a customer ID, when there is no designation. The encryption selection area D206 is an area for selecting a method of encrypting data in the object store to be registered.

The Tag button D211 is a button for receiving a Tag configured with a set of a name and a value. When the Tag button D211 is pressed, a screen (not illustrated) for inputting the tag is displayed and input of Tag is received.

The OK button D212 is a button for receiving an instruction to register the object store set on the new store registration screen D20. When the OK button D212 is pressed, the storage system 10 performs a process for registering the object store set on the new store registration screen D20 (object store registration process: see FIG. 9).

The cancel button D213 is a button for receiving cancellation of registration of an object store. When the cancel button D213 is pressed, the storage system 10 finishes the registration of the object store and closes the new store registration screen D20.

Next, an object store registration process is described.

Figure 9:
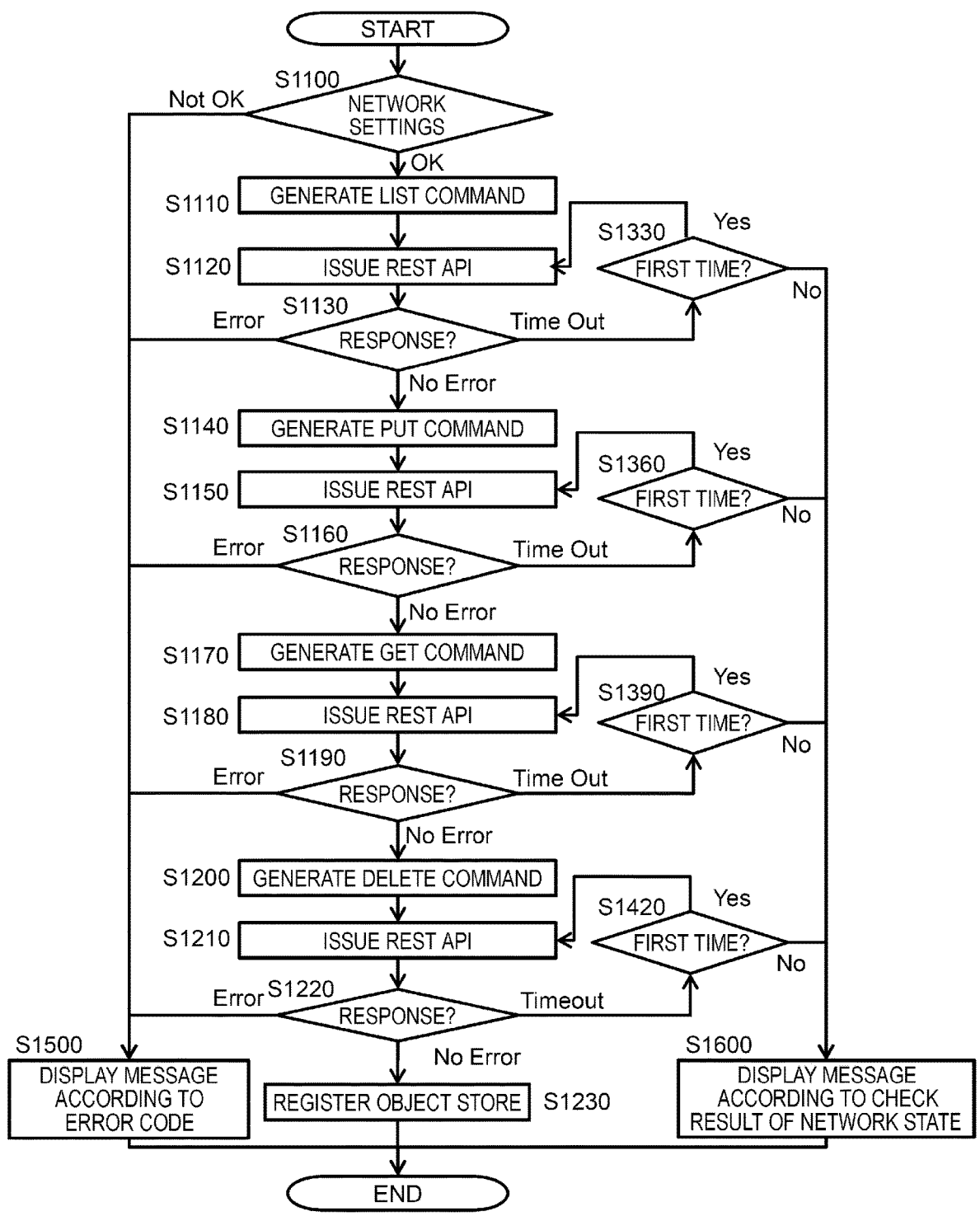
FIG. 9 is a flowchart of an object store registration process according to the first embodiment.

FIG. 9 is a flowchart of an object store registration process according to the first embodiment.

The object store registration process is executed by the object store registration management function P1660. When registering an object store, when object store authentication information is incorrect or appropriate access authority to the object store has not been granted, all backup operations become errors in the backup process in which backup is performed on this object store, and the backup process is not performed properly. In order to prevent such a situation, the storage system 10 performs an access test on an object store to be registered (referred to as a target object store in the description of this process) in the object store registration process.

In the object store registration process, first, the object store registration management function P1660 (strictly speaking, the processor of the storage management subsystem 160 that executes the storage management program P160) cooperates with the network communication management function P1620 to check whether network settings (for example, access ID and secret key settings for the target object store) for accessing the cloud service selected on the new store registration screen D20 are appropriate for the I/O control subsystem 150 (S1100). As a result, when it is checked that the network settings are not appropriate (Not OK in S1100), the object store registration management function P1660 displays a message prompting review of settings based on an error code regarding the network settings (S1500), and ends the process. An example of the message prompting review of settings is a message such as "Access ID or Secret Key is incorrect. Please check it out.".

On the other hand, when it is checked that the network settings are appropriate (OK in S1100), the object store registration management function P1660 cooperates with the I/O control program P150 to create a LIST command in order to check browsing authority of the target object store (S1110), and issues it to the object storage system 230 as REST API (S1120). The LIST command is a command to acquire a list of objects of the object store.

Next, the object store registration management function P1660 checks a response to the LIST command (S1130).

When it is checked that the response is an error (Error in S1130), the object store registration management function P1660 displays a message to review the access authority setting of the object store based on an error code corresponding to this error (S1500).

When it is checked that the response does not return within a certain period of time and times out (Time Out in S1130), the object store registration management function P1660 determines whether the timeout is the first time (S1330). When it is determined that the timeout is the first time (Yes in S1330), the object store registration management function P1660 makes the process proceed to step S1120 and issues REST API again. On the other hand, when it is determined that the timeout is not the first time, that is, if it is a second timeout (No in S1330), since poor network communication is suspected, the object store registration management function P1660 displays a message to check the network status (S1600), and ends the process.

When it is checked that the response is normal (No Error in S1130), the object store registration management function P1660 cooperates with the I/O control program P150 to generate a PUT command in order to check the write authority for the target object store (S1140), and issues it to the object storage system 230 as REST API (S1150).

Next, the object store registration management function P1660 checks a response to the PUT command (S1160).

A process according to a check result of the response in step S1160 is the same as the process according to the check result of the response in step S1130 described above (S1360, S1500, and S1600).

When it is checked that the response is normal (No Error in S1160), the object store registration management function P1660 cooperates with the I/O control program P150 to generate a GET command in order to check the read authority for the target object store (S1170), and issues it to the object storage system 230 as REST API (S1180).

Next, the object store registration management function P1660 checks a response to the GET command (S1190).

A process according to a check result of the response in step S1190 is the same as the process according to the check result of the response in step S1130 described above (S1390, S1500, and S1600).

When it is checked that the response is normal (No Error in S1190), the object store registration management function P1660 cooperates with the I/O control program P150 to generate a DELETE command in order to check the deletion authority for the target object store (S1200), and issues it to the object storage system 230 as REST API (S1210).

Next, the object store registration management function P1660 checks a response to the DELETE command (S1220).

A process according to a check result of the response in step S1220 is the same as the process according to the check result of the response in step S1130 described above (S1420, S1500, and S1600).

When it is checked that the response is normal (No Error in S1220), since it means that a series of processes for using the object store normally has been checked, the object store registration management function P1660 registers information on a new object store set on the new store registration screen D20 (S1230), and ends the object store registration process.

Next, the backup schedule setting screen D30 for setting a schedule for backup using the registered object store will be described.

Figure 10:
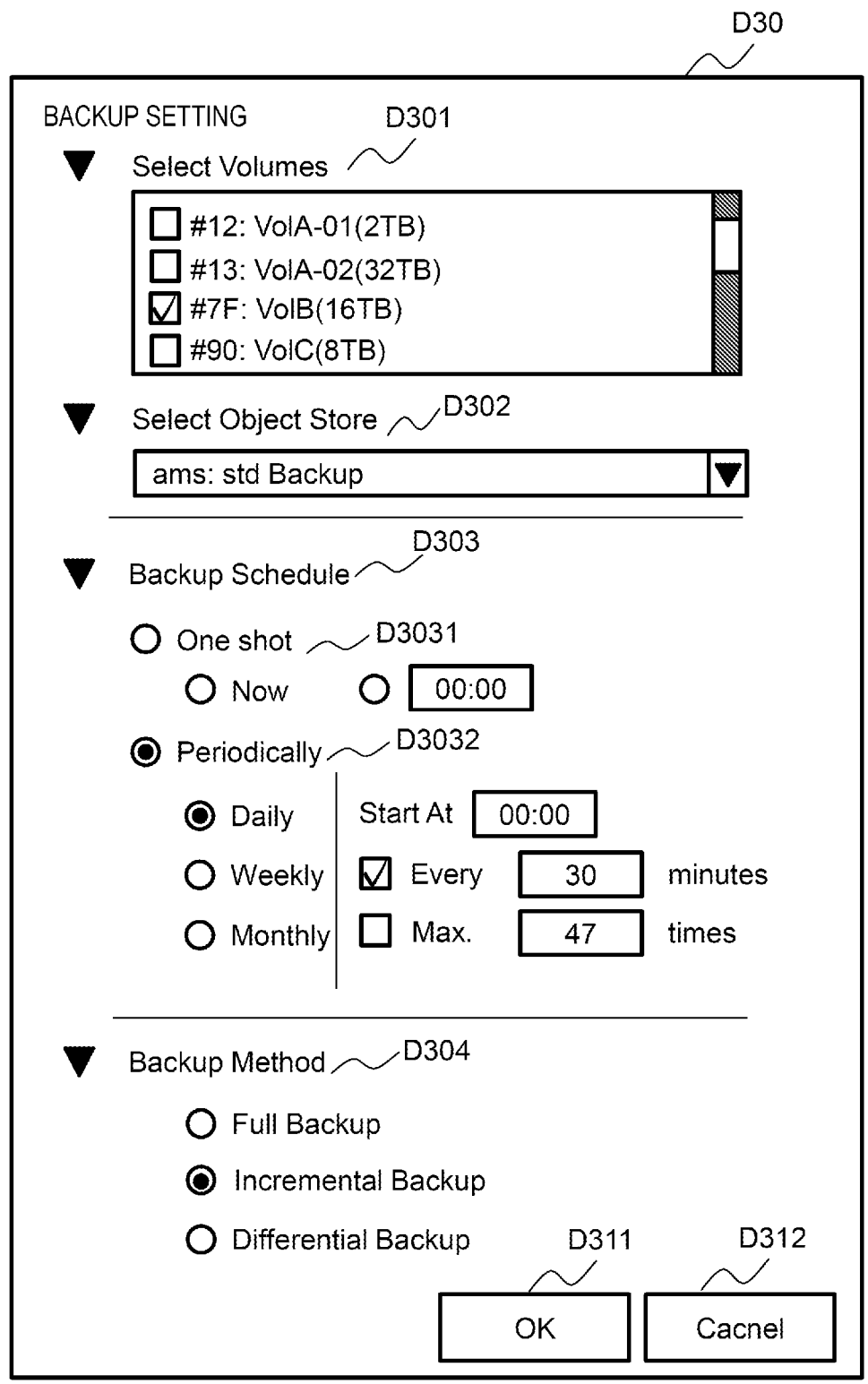
FIG. 10 is a diagram illustrating a backup schedule setting screen according to the first embodiment.

FIG. 10 is a diagram illustrating a backup schedule setting screen according to the first embodiment. The backup schedule setting screen D30 is provided to the terminals 17a, 17b, and the like by the object store registration management function P1660 and the GUI and CLI component P1610.

The backup schedule setting screen D30 includes a logical volume selection area D301, an object store selection area D302, a backup schedule setting area D303, and a backup method selection area D304.

The logical volume selection area D301 is an area for selecting a logical volume to be backed up. In the example of FIG. 10, in the logical volume selection area D301, a logical volume of VolB (16 TB) indicated by a volume number 7F is selected as a backup target.

The object store selection area D302 is configured with, for example, a drop-down box, and is used to select an object store as a backup destination of the logical volume. In the object store selection area D302, object stores that have already been registered using the screens of FIGS. 8A and 8B are displayed so as to be selectable. In the example of FIG. 10, the object store corresponding to "ams: std Backup" is selected.

The backup schedule setting area D303 is an area for setting a backup schedule. In the backup schedule setting area D303, for example, a One shot designation button D3031 for setting a one-time backup execution and a Periodically designation button D3032 for setting a periodic backup execution are displayed. When the One shot designation button D3031 is selected, immediate execution or execution start time can be designated. When the Periodically designation button D3032 is selected, repetition intervals (for example, daily, weekly, monthly), execution start time, execution interval time, number of times of execution, and the like can be designated. In the example of FIG. 10, periodic execution is selected as the backup schedule, and it is designated that the backup is to be performed daily, starting at 0:00 every day at 30-minute intervals.

The backup method selection area D304 is an area for setting a backup method. In the example of FIG. 10, the selectable backup methods include a full backup that backs up the entire logical volume, an incremental backup that backs up only the difference of the logical volume from the previous backup, and a differential backup that backs up the difference from the logical volume during the last full backup. In the example of FIG. 10, the incremental backup is designated.

The OK button D311 is a button for receiving an instruction to register the backup schedule set on the backup schedule setting screen D30. When the OK button D311 is pressed, the set backup schedule is registered in a scheduler of the storage management subsystem 160.

The cancel button D312 is a button for receiving an instruction to discard the backup schedule set on the backup schedule setting screen D30. When the cancel button D312 is pressed, the set backup schedule is discarded.

A plurality of backup schedules may be created for one logical volume. For example, for the logical volume to be backed up, a schedule for a full backup at 0:00 every Sunday and a schedule for incremental backup at 0:00 from Monday to Saturday may be created. In this case, the backup of the logical volume will be performed according to a schedule combining these.

Next, the backup process will be described.

Figure 11:
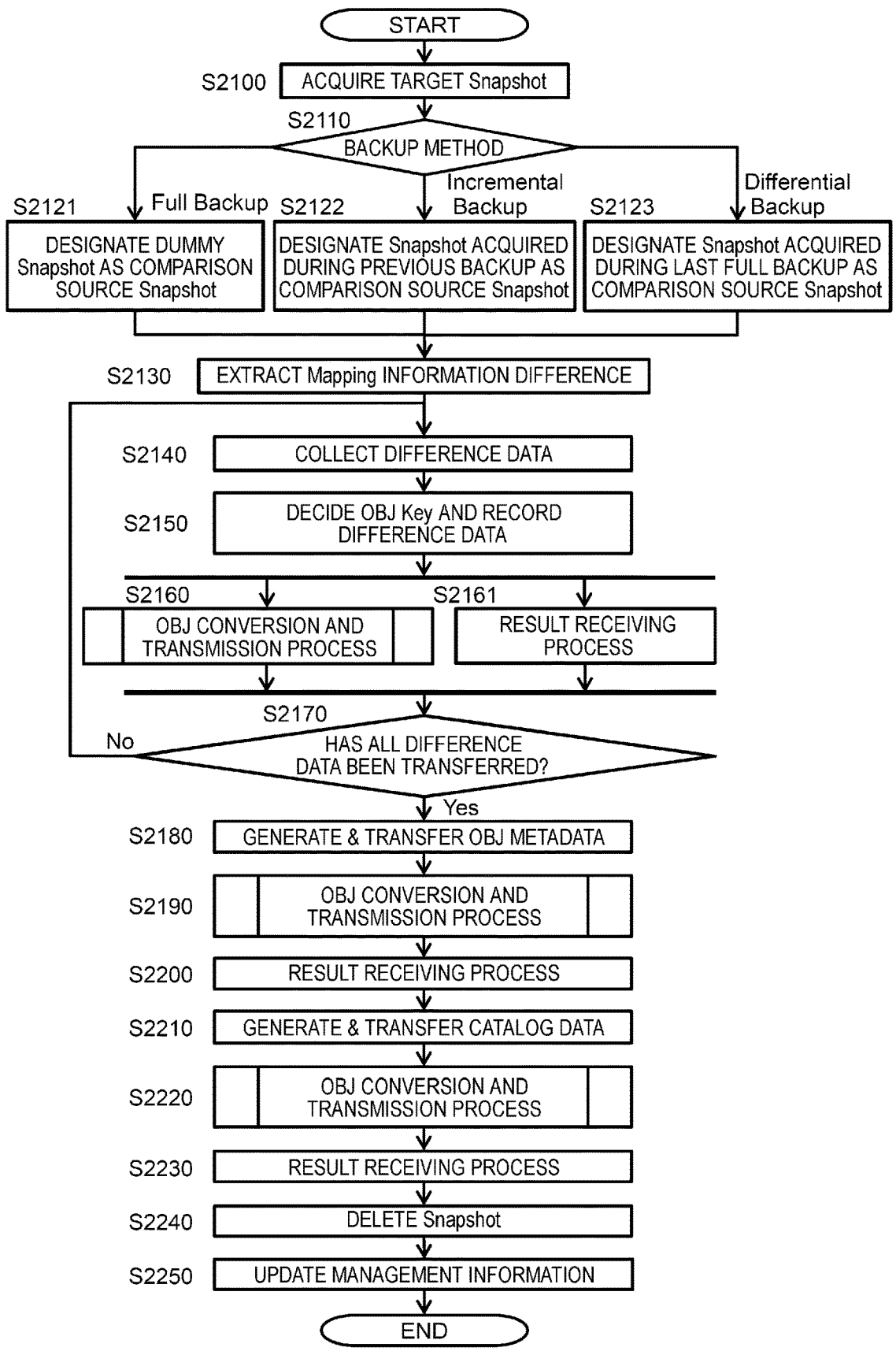
FIG. 11 is a flowchart of a backup process according to the first embodiment.

FIG. 11 is a flowchart of the backup process according to the first embodiment.

The backup process is performed by the backup management function P1670 issuing an instruction to the I/O control program P150 based on the set backup schedule. Information necessary for the operation is appropriately shared by the backup management function P1670 and the I/O control program P150.

When the operation instruction is received from the backup management function P1670, the I/O control program P150 uses the Point-in-Time copy function P1530 to acquire a snapshot of the logical volume to be backed up (target logical volume) (S2100). Specifically, as described with reference to FIGS. 6 and 7, this is implemented by copying the mapping information (information of column) of the target logical volume of the mapping table 400.

Next, the I/O control program P150 checks the set backup method (S2110).

When the full backup is designated as the backup method (Full Backup in S2110), the I/O control program P150 designates a dummy snapshot as a comparison source snapshot for creating backup data (S2121). The dummy snapshot is a snapshot in which all pool addresses are filled with 0 (NULL) which means an invalid value.

When the incremental backup is designated as the backup method (Incremental Backup in S2110), the I/O control program P150 designates the snapshot acquired during the previous backup as the comparison source snapshot (S2122).

When the differential backup is designated as the backup method (Differential Backup in S2110), the I/O control program P150 designates a snapshot acquired during the last full backup as the comparison source snapshot (S2123).

When the current backup is the first time, since the previous snapshot and the snapshot taken during the last full backup do not exist, even when the incremental backup or the differential backup is designated, the dummy snapshot is designated as the comparison source snapshot. Therefore, in this case, incremental data of the incremental backup (incremental backup data) and difference data of the differential backup are full data (full backup data) of the volume.

After executing steps S2121, S2122, or S2123, the I/O control program P150 specifies data to be backed up (backup data) by the mapping difference extraction function P1531 (S2130). Specifically, the mapping difference extraction function P1531 extracts a difference between the comparison source snapshot and the snapshot to be backed up (basically the latest snapshot) by taking the exclusive OR of the pool addresses corresponding to respective block numbers of the logical volume. When a result of the exclusive OR is 0, that is, when the pool addresses are the same, it indicates that data in the block of the logical volume has not been changed and the data in that block is not a backup target. When the result of the exclusive OR is non-zero (non-zero is treated as 1), that is, when the pool addresses are different, it indicates that data in the block has been changed and the data in that block is the difference data to be backed up.

Next, in order to collect data of a plurality of blocks (target blocks) specified as targets to be backed up and form an object, the I/O control program P150 reads data of the target block from the storage pool 600 and stores the data in a transfer memory based on the extraction result in step S2130 (S2140). Here, when it is not possible to read all data at once due to resource constraints of the I/O control subsystem 150, a process may be performed for each fixed size (for example, 16 MB and the like).

Next, the I/O control program P150 decides a name (OBJ Key) of the object to be transmitted this time, and accumulates information on blocks (for example, the presence/absence of compression, size, and the like) included in this object (S2150).

Next, the I/O control program P150 uses the object conversion function P1535 and the API communication management function P1536 to execute an object (OBJ) conversion and transmission process (see FIG. 13) for converting the backup data into the object and transmitting the object to the object store (S2160). The I/O control program P150 receives a reception result from the object store asynchronously with the object conversion and transmission process, and checks whether the object has been successfully transferred (S2161).

The I/O control program P150 determines whether all the data to be backed up (difference data) has been transferred (S2170). When it is determined that all the data has not been transferred (No in S2170), the I/O control program P150 makes the process proceed to step S2140 and executes a process for transferring data that has not been transferred.

On the other hand, when all the data to be backed up has been transferred (Yes in S2170), the I/O control program P150 generates metadata (see FIG. 15) about the data to be backed up and stores the metadata in the transfer memory. Next, the I/O control program P150 uses the object conversion function P1535 and the API communication management function P1536 to execute an object conversion and transmission process for storing the metadata in the object store as an object (S2190).

Next, the I/O control program P150 checks that the metadata has been successfully transferred (S2200). As a result, when it has been checked that the metadata has been successfully transferred, since it indicates that it has been checked that the data to be backed up and its metadata has been stored in the object store, the I/O control program P150 generates catalog data (FIG. 16A and FIG. 16B) including various information related to backup data to be referenced during restoration, and stores the catalog data in the transfer memory (S2210).

Next, the I/O control program P150 executes an object (OBJ) conversion and transmission process (see FIG. 13) for converting the catalog data into an object and transmitting the object to the object store (S2220).

Next, the I/O control program P150 checks that the catalog data has been successfully transferred (S2230).

After that, the I/O control program P150 executes a disposal process for the snapshot used for backup. This is because when a snapshot is acquired for each backup and left in the storage system 10 as it is, the number of snapshots becomes enormous and data stored in the storage system 10 becomes enormous. Therefore, the I/O control program P150, for example, deletes snapshots of older generations exceeding a predetermined number of generations (for example, 3) of snapshots to be retained, which are preset in the storage system 10 by the user (S2240). When the differential backup is designated as the backup method, the snapshot acquired during the last full backup may be excluded from deletion targets. A snapshot is deleted by deleting a corresponding snapshot (column of the mapping table 400) from the mapping table 400. By deleting the snapshots in this way, the blocks of the storage pool 600 that are no longer referenced anywhere in the mapping table 400 are collected by the I/O control program P150 and reused at appropriate timing, so that the capacity of the storage pool 600 can be recovered appropriately.

Next, the I/O control program P150 updates the management information, and ends the process (step S2250).

According to the backup process described above, a method designated by the user among the full backup, the incremental backup, and the differential backup can be used as the backup method.

Next, the process for specifying backup data in steps S2110 to S2130 of the backup process is specifically described.

Figure 12A:
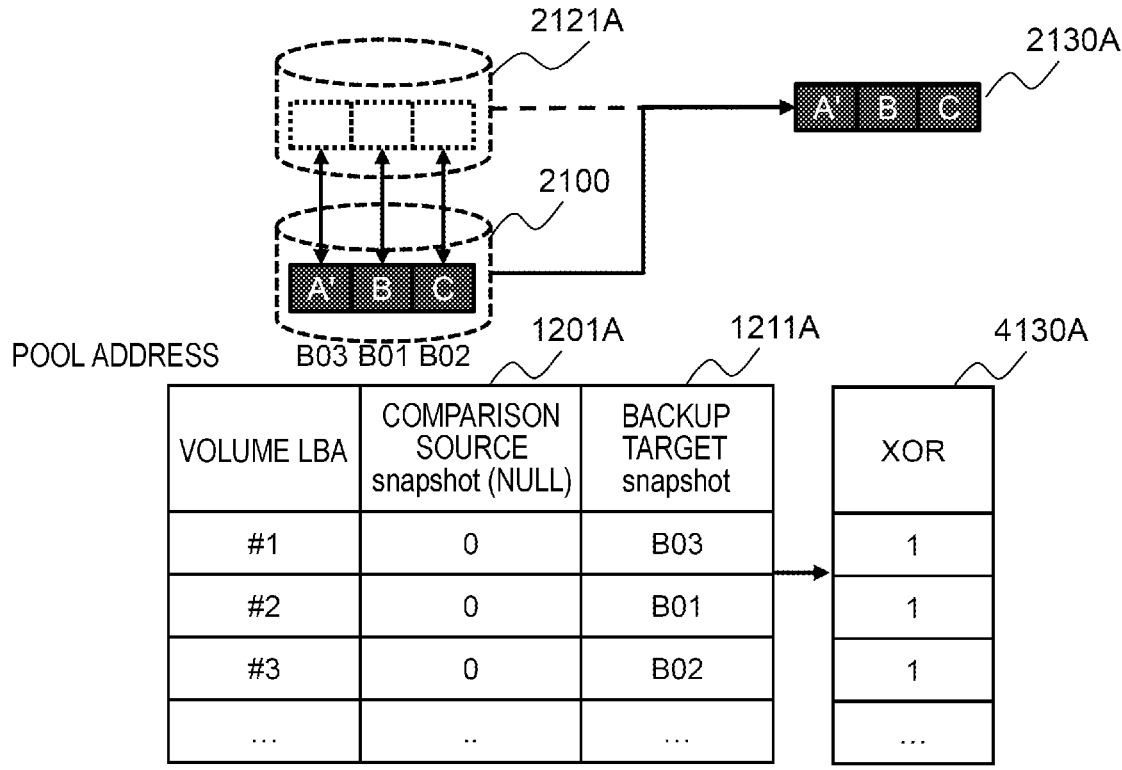
FIG. 12A is a diagram for describing backup data in a full backup according to the first embodiment.

FIG. 12A is a diagram for describing backup data in a full backup according to the first embodiment. FIG. 12A illustrates an example of specifying backup data when the backup method is determined to be the full backup in step S2110 in a case where the snapshot to be backed up is a snapshot 1211A corresponding to a logical volume 2100.

In this case, in step S2121, a dummy snapshot corresponding to a logical volume 2121A, that is, a snapshot 1201A, in which pool addresses corresponding to all LBAs of the volume are NULL, is designated as a comparison source snapshot. Next, in step S2130, for the snapshot 1201A and the snapshot 1211A, the exclusive OR (XOR) of the pool addresses corresponding to addresses of the same logical volume (LBA) is taken. Here, since each pool address of the snapshot 1201A is 0, when taking the exclusive OR of the pool addresses, data in all blocks becomes 1 (not 0) indicating that the data is to be backed up, as illustrated in a result 4130A. Therefore, backup data 2130A is specified as including data for all blocks of the logical volume 2100 corresponding to the snapshot 1211A.

Figure 12B:
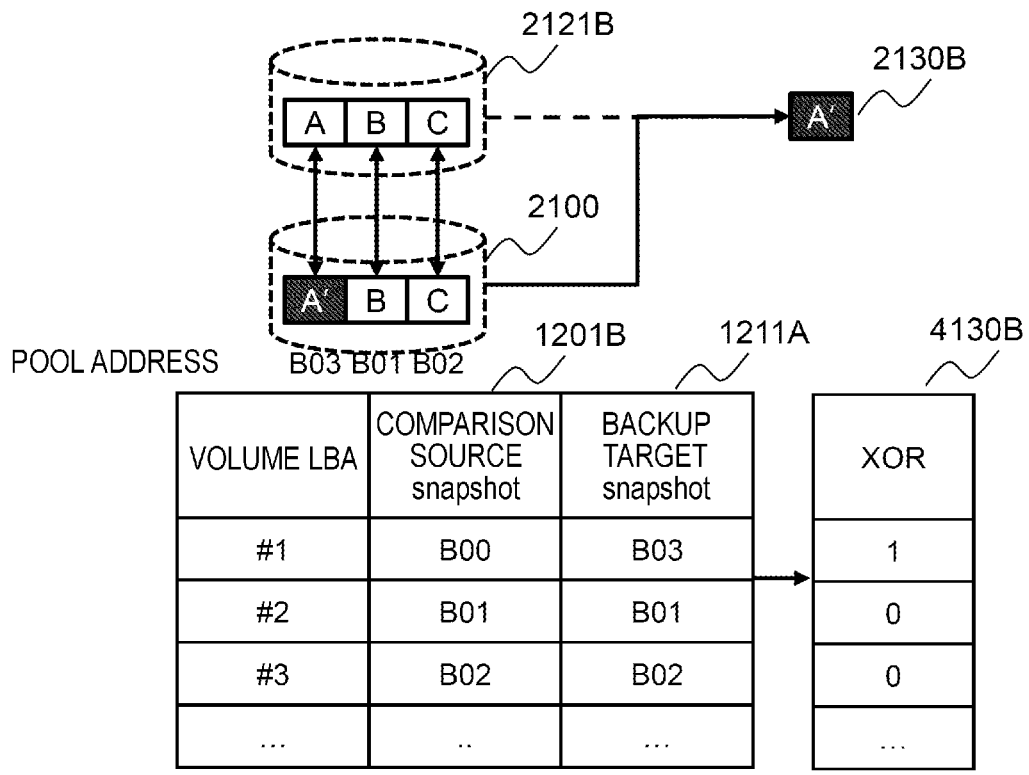
FIG. 12B is a diagram for describing backup data in an incremental backup according to the first embodiment.

FIG. 12B is a diagram for describing backup data in the incremental backup according to the first embodiment. FIG. 12B illustrates an example of specifying backup data when the backup method is determined to be the incremental backup in step S2110 in a case where the snapshot to be backed up is the snapshot 1211A corresponding to the logical volume 2100.

In this case, in step S2122, a previous snapshot 1201B to be backed up corresponding to a logical volume 2121B is designated as the comparison source snapshot. Next, in step S2130, for the snapshot 1201B and the snapshot 1211A, the exclusive OR of the pool addresses corresponding to addresses of the same logical volume is taken. When taking the exclusive OR of the pool addresses, only the data in the block with LBA #1 becomes 1 (not 0) indicating that the data is to be backed up, as illustrated in the result 4130B. Therefore, backup data 2130B is specified as data (in the example of the figure, "A'") of block #1 of the logical volume 2100 corresponding to the snapshot 1211A.

Figure 12C:
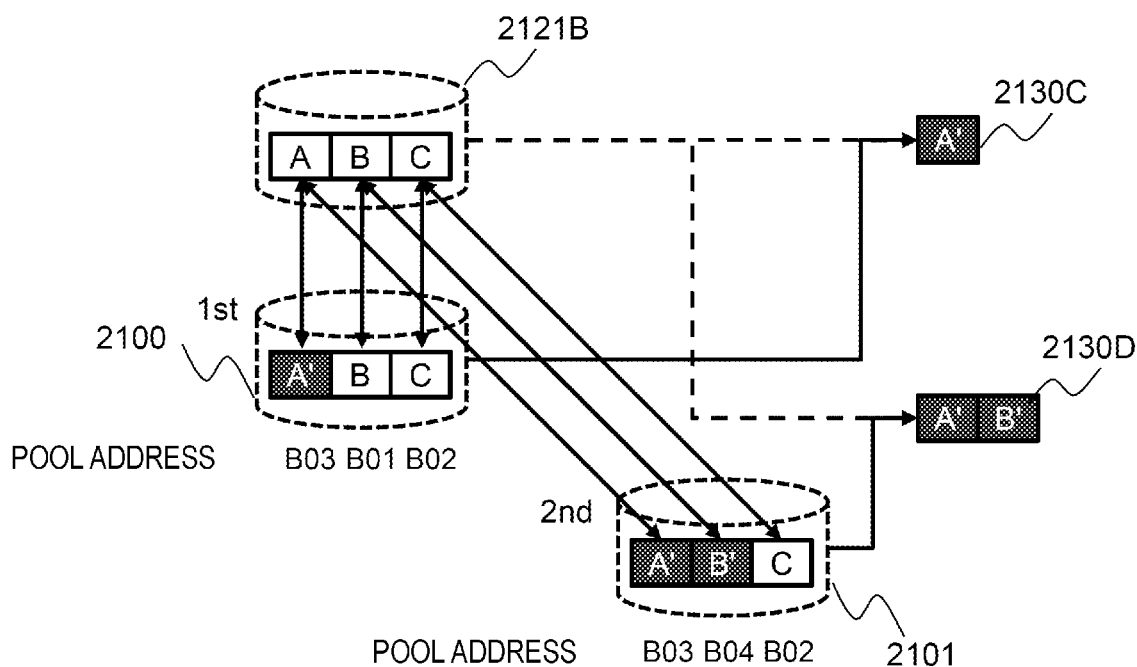
FIG. 12C is a diagram for describing backup data in a differential backup according to the first embodiment.

FIG. 12C is a diagram for describing backup data in the differential backup according to the first embodiment. FIG. 12C illustrates an example of specifying backup data when the backup method is determined to be the differential backup in S2110 in a case where a first (1st) backup target snapshot is the snapshot 1211A corresponding to the logical volume 2100 and a second (2nd) backup target snapshot is a snapshot 1211C corresponding to a logical volume 2101.

In this case, in step S2123 during the first backup, the snapshot 1201B to be backed up in the last backup corresponding to the logical volume 2121B is designated as the comparison source snapshot. Next, in step S2130, for the snapshot 1201B and the snapshot 1211A, the exclusive OR of the pool addresses corresponding to addresses of the same logical volume is taken. When taking the exclusive OR of the pool addresses, only the data in the block with LBA #1 becomes 1 (not 0) indicating that the data is to be backed up, as illustrated in a result 4130C. Therefore, backup data 2130C is specified as data (in the example of the figure, "A'") of block #1 of the logical volume 2100 corresponding to the snapshot 1211A.

Furthermore, in step S2123 during the second backup, the snapshot 1201B to be backed up in the last full backup corresponding to the logical volume 2121B is designated as the comparison source snapshot. Next, in step S2130, for the snapshot 1201B and the snapshot 1211C, the exclusive OR of the pool addresses corresponding to addresses of the same logical volume is taken. When taking the exclusive OR of the pool addresses, data of blocks with LBA #1 and #2 become 1 (not 0) indicating that the data are to be backed up, as illustrated in a result 4130D. Therefore, backup data 2130D is specified as data (in the example of the figure, "A'" and "B'") of blocks #1 and #2 of the logical volume 2101 corresponding to the snapshot 1211C. According to the differential backup, it can be seen that the second backup data includes cumulative changes between the logical volumes during the last full backup, such as the data "A'" included in the first backup data.

Next, the object conversion and transmission process (S2160, S2190, and S2220) is described.

FIG. 13 is a flowchart of the object conversion and transmission process according to the first embodiment.

In the object conversion and transmission process, the storage system 10 converts data to be processed that is stored in binary format into text format, and transmits it by REST API using an HTTP protocol.

The I/O control program P150 uses the object conversion function P1535 to encode data to be processed stored in the transfer memory into text data according to, for example, BASE64 (S3100). Next, the I/O control program P150 calculates an MD5 hash value for data protection from the encoded data (S3110). Next, the I/O control program P150 uses the access ID of registration information of the object store and the secret key to perform predetermined calculation and create authentication information (S3120). Next, the API communication management function P1536 of the I/O control program P150 constructs object data with the created MD5 hash value and authentication information, transmission date and time, size information, and the like as an HTTP header and the encoded text data as an HTTP body (S3130), and stores the object data in the object store through REST API communication using the PUT or POST command (S3140). With this configuration, an object of the data to be processed is stored in the object store.

Next, stored data stored in the object store of the object storage system 230 is described.

Figure 14:
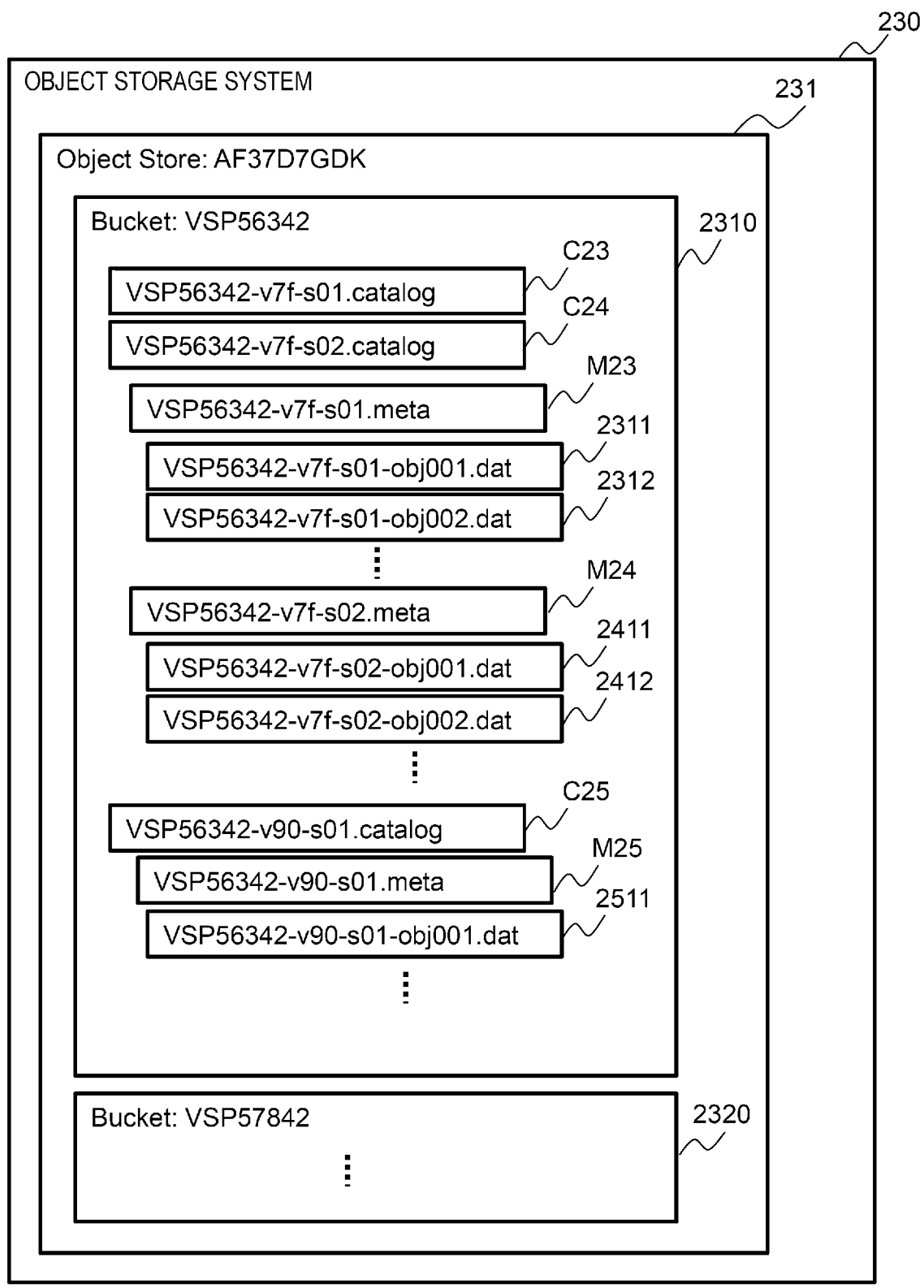
FIG. 14 is a diagram for describing data stored in an object store of an object storage system according to the first embodiment.

FIG. 14 is a diagram for describing stored data of the object store of the object storage system according to the first embodiment.

In the object storage system 230, an object store 231 is configured. In the object store 231, one or more buckets 2310 and 2320 are configured.

In the bucket 2310, backup data of the storage system 10 is stored. In the example of FIG. 14, the bucket 2310 stores catalog data C23 of the first generation backup and catalog data C24 of the second generation backup of the logical volume with logical volume number 0x7f, metadata M23 referenced by the catalog data C23, one or more backup data 2311, 2312, . . . referenced by the metadata M23, metadata M24 referenced by the catalog data C24, and one or more backup data 2411, 2412, . . . referenced by the metadata M24.

The bucket 2310 stores catalog data C25, metadata M25, backup data 2511, . . . , and the like as data related to backup of a logical volume with logical volume number 0x90.

A bucket 2320 is, for example, a bucket in which backup data of another storage system with the same authentication information registered is stored.

Next, metadata is described.

FIG. 15 is a configuration diagram of metadata according to the first embodiment. FIG. 15 corresponds to the metadata M24 illustrated in FIG. 14.

The metadata M24 is stored in the object store in correlation with a unique object key corresponding to a name of an object of metadata. The object key is configured by combining, for example, a product number of the storage system 10, a volume number, a backup generation number, and the like. In this example, an object key of metadata M24 is VSP56342-v7f-s02.meta.

The metadata M24 includes a bitmap size T1510, a bitmap T1511, and one or more data object keys (T1520, T1530, T1540, and the like), and block length sets (T1521, T1531, T1541, and the like).

The bitmap size T1510 stores a size of the bitmap stored in the bitmap T1511.

The bitmap T1511 stores a bitmap indicating the positions (storage positions) of the blocks of the logical volume included in backup data. Specifically, the bitmap of the bitmap T1511 indicates whether data of the block, which is the result of the exclusive OR between snapshots to be compared, which was used when extracting data to be backed up, is included in the backup data in order of block number. In this embodiment, when the data of the block is included, a bit corresponding to the block is set to 1, and when not included, the bit corresponding to the block is set to 0. For example, in the example in FIG. 15, it is indicated that, since the bitmap of bitmap T1511 is "110011 . . . ", data of blocks with block numbers #1, #2, #5, #6, . . . whose bits are "1" are included in the backup data, and data of blocks with block numbers #3 and #4 whose bits are "0" are not included in the backup data.

The data object key (T1520, T1530, T1540, and the like) stores an object key that indicates an object that stores backup data. Here, in this embodiment, when transferring backup data in one backup as an object, for example, the backup data object is divided into fixed sized portions and each of which is processed as an object. Therefore, there may be a plurality of objects storing backup data, and there may be a plurality of data object keys indicating the objects.

The block length (T1521, T1531, T1541, and the like) stores a data length (block size) of each block in the portion of backup data included in the object. This block length is used to determine where a block length of one block ends in the backup data. In the example of FIG. 15, the backup data is stored without being compressed, and thus the same values are arranged in the block length, but when the blocks are compressed and stored, the block lengths of the respective compressed blocks are arranged.

Next, catalog data is described. The catalog data is data created during backup, and stores various information to be referenced during restoration. Information stored in the catalog data includes, for example, a logical volume of a backup source, a capacity required for restoration, an object key for accessing backup data, a parent-child relationship of a catalog of the backup data, and the like.

FIG. 16A is a first example of catalog data according to the first embodiment, and FIG. 16B is a second example of catalog data according to the first embodiment. FIG. 16A illustrates catalog data created during the second backup of the logical volume, and corresponds to catalog data C24 of FIG. 14, and FIG. 16B illustrates catalog data created during the first backup of the logical volume, and corresponds to catalog data C23 of FIG. 14.

The catalog data C24 is stored in the object store in correlation with an object key called VSP56342-v7f-s02.catalog.

The catalog data C24 stores an apparatus product number T1610, a backup volume number T1611, a Volume usage/provisioning size T1612, a Snapshot generation number T1613, a Snapshot acquisition date and time T1614, a metadata object key T1615, and a parent catalog object key T1616.

The apparatus product number T1610 stores an apparatus product number of the storage system 10. The backup volume number T1611 stores a volume number that identifies a logical volume to be backed up.

The Volume usage/provisioning size T1612 stores a provisioning size (allocation capacity) and used size of the logical volume to be backed up. The Snapshot generation number T1613 stores a generation number of a snapshot corresponding to catalog data. The Snapshot acquisition date and time T1614 stores the acquisition date and time of the snapshot corresponding to the catalog data. The metadata object key T1615 stores an object key indicating an object storing metadata corresponding to catalog data. The parent catalog object key T1616 stores the object key of an object of the catalog data during backup of the parent generation (last generation). A generation relationship (parent-child relationship) between backups of the same volume can be specified by this object key.

According to the catalog data C24, it can be seen that it is catalog data related to the backup of the logical volume with the volume number of 0x7f in the storage system 10 with the apparatus product number of VSP56342, and the logical volume becomes 16 TB when restored. Further, it can be seen that the snapshot has a generation number of 2 and was acquired at 21:00:17 on Apr. 28, 2021, and it is sufficient to refer to the object of the metadata with an object key of VSP56342-v7f-s02.meta in order to access backup data. Furthermore, it can be seen that there exists an object of catalog data with an object key of VSP56342-v7f-s02.catalog as catalog data (parent catalog data) corresponding to the snapshot of the previous generation (parent generation). When parent catalog data exists, it means that, when restoring a logical volume to be backed up, it is necessary to perform restoration based on the parent catalog data before performing restoration based on the catalog data.

The catalog data C23 is stored in the object store in correlation with an object key called VSP56342-v7f-s01.catalog.

The catalog data C23 stores an apparatus product number T1710, a backup volume number T1711, a Volume usage/provisioning size T1712, a Snapshot generation number T1713, a Snapshot acquisition date and time T1714, a metadata object key T1715, and a parent catalog object key T1716. Each field stores the same information as the field with the same name in the catalog data C24.

According to catalog data C23, it can be seen that it is catalog data of the backup targeted for the same logical volume of the same storage system 10 as that of the catalog data C24, the snapshot has a generation number of 1 and was acquired at 18:00:14 on Apr. 28, 2021, and it is sufficient to refer to the object of the metadata with an object key of VSP56342-v7f-s01.meta in order to access backup data. Since an object key for the parent catalog data does not exist, the parent catalog does not exist, that is, it means that it is the first snapshot, and it can be seen that it is sufficient to perform restoration based on this catalog data.

Next, a restore process for restoring a logical volume is described.

First, a restore selection screen for selecting various settings for the restore process in the storage system 10 is described.

Figure 17:
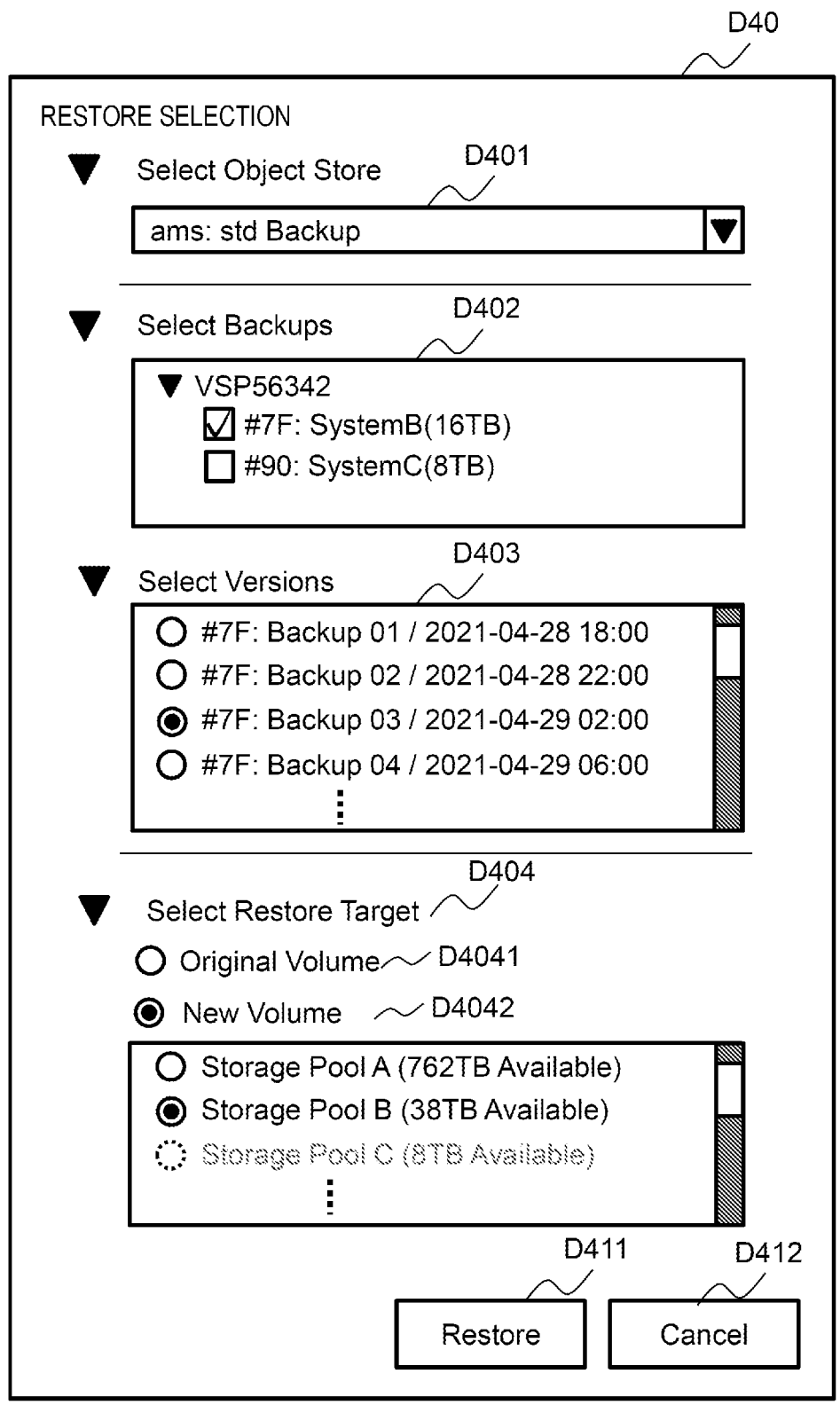
FIG. 17 is a diagram illustrating a restore selection screen according to the first embodiment.

FIG. 17 is a diagram illustrating a restore selection screen according to the first embodiment. A restore selection screen D40 is provided to the terminals 17a, 17b, and the like by the GUI and CLI component P1610 and the restore management function P1680 of the storage management program P160.

The restore selection screen D40 includes an object store selection area D401, a restore volume selection area D402, a backup version selection area D403, a restore destination selection area D404, a Restore button D411, and a Cancel button D412.

The object store selection area D401 is configured with, for example, a drop-down box, and is an area for selecting an object store in which a backup of the logical volume to be restored is stored. In the object store selection area D401, the object stores already registered using the screens of FIGS. 8A and 8B are displayed so as to be selectable. In the example of FIG. 17, the object store corresponding to "ams: std Backup" has been selected.

In the restore volume selection area D402, the volumes to be restored are displayed so as to be selectable. In the restore volume selection area D402, information on the volume of which the backup data is stored in the object store selected in the object store selection area D401 is displayed. A list of volumes of which the backup data is stored in the object store and backup data for display in the restore volume selection area D402 and the backup version selection area D403 is acquired in advance. A backup list acquisition process for acquiring the list of the volumes and backup data will be described later.

In the backup version selection area D403, the backup data of the volume to be restored is displayed so as to be selectable. In the backup version selection area D403, backup data for the volume selected in the restore volume selection area D402 among the backup data stored in the data store is displayed. In the example of FIG. 17, since the logical volume with the logical volume number #7F is selected in the restore volume selection area D402, only the backup data for the logical volume with the logical volume number #7F is displayed in the backup version selection area D403.

The restore destination selection area D404 is an area for selecting a volume for restoring the logical volume. The restore destination selection area D404 includes an original volume designation button D4041 and a new volume designation button D4042.

The original volume designation button D4041 receives a selection instruction to set an original volume as the restore destination. The new volume designation button D4042 receives a selection instruction to set a new volume as the restore destination. When the new volume designation button D4042 is selected, storage pools in which new volumes can be created are displayed so as to be selectable. For example, in the example of FIG. 17, in the restore destination selection area D404, the new volume designation button D4042 is selected, the storage pools in which new volumes can be created are displayed, and a storage pool B is selected among them. The storage management program P160 may display a storage pool, which has insufficient capacity to restore a logical volume, selected among the storage pools as being unselectable.

The Restore button D411 is a button for receiving an instruction to execute the restore set on the restore selection screen D40. When the Restore button D411 is pressed, the storage management function P180 causes the I/O control program P150 to execute the restore process (see FIG. 19).

The cancel button D412 is a button for receiving an instruction to discard the restore set on the restore selection screen D40. When the cancel button D412 is pressed, the restore selection that has been set is discarded.

Figure 18:
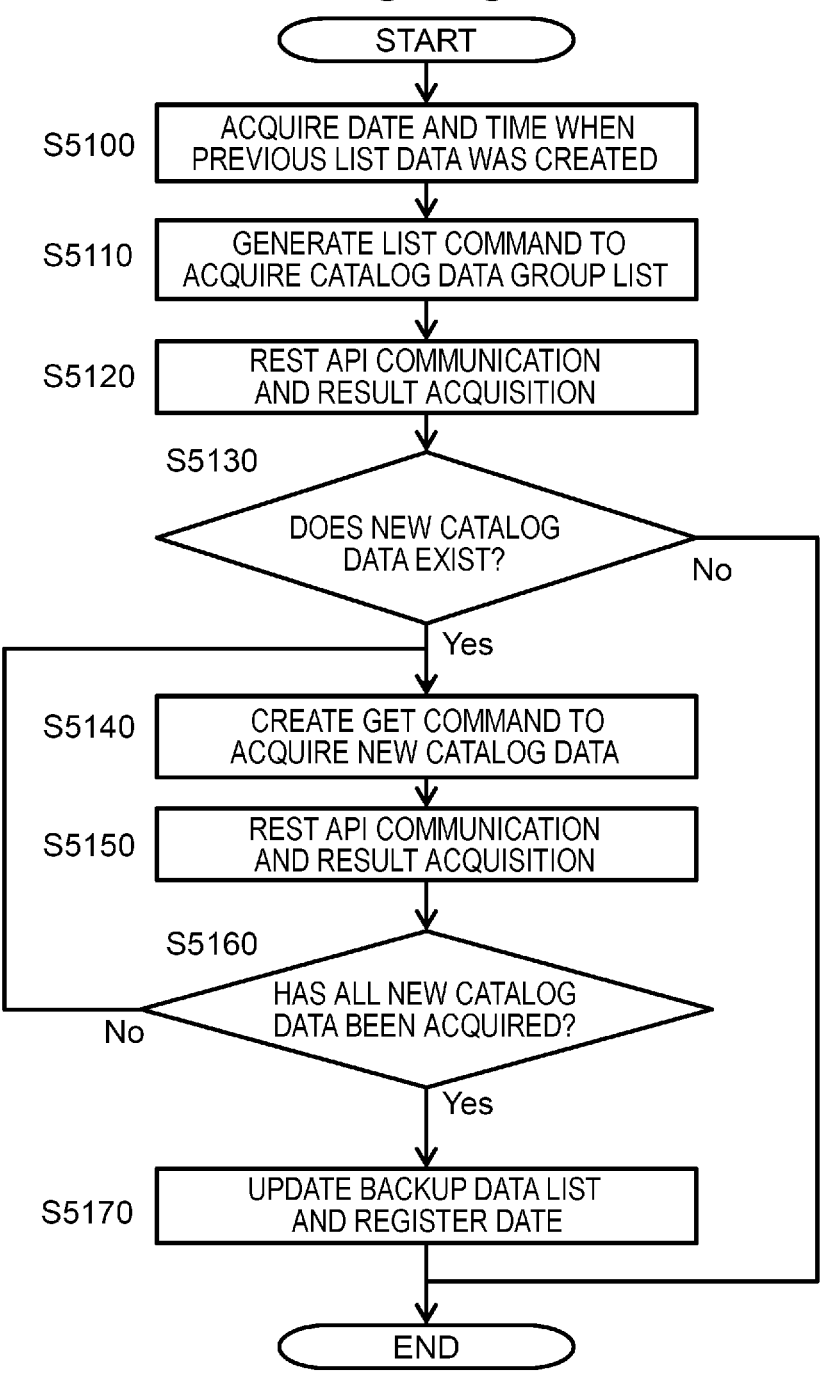
FIG. 18 is a flowchart of a backup list acquisition process according to the first embodiment.

Next, a backup list acquisition process is described. FIG. 18 is a flowchart of a backup list acquisition process according to the first embodiment. The backup list acquisition process is a process for acquiring a list of backup data used for displaying the restore selection screen D40 of FIG. 17.

Prior to displaying the restore selection screen D40, the storage management program P160 acquires the date and time when the previous backup data list was created (S5100). The date and time when the previous backup data list was created are registered in the storage system 10 when the previous backup data list was created.

Next, the storage management program P160 cooperates with the I/O control program P150 to generate a LIST command to acquire a list of catalog data of the object store (S5110). Specifically, the storage management program P160 generates a command to acquire all object keys that end with ".catalog" indicating catalog data.

Next, the storage management program P160 issues the LIST command to the object storage system 230 via the API communication management function P1536, and obtains the result for the LIST command (S5120).

Next, the storage management program P160 determines whether there exists new catalog data that was not included in the list acquired at a previous time (S5130). As a result, when it is determined that new catalog data does not exist (No in S5130), it means that the list of backup data acquired at the previous time is the latest one, and thus the storage management program P160 ends the process.

On the other hand, when it is determined that new catalog data exists (Yes in S5130), in order to acquire various information included in one catalog data of the new catalog data, the storage management program P160 creates a GET command to acquire this catalog data (S5140). Next, the storage management program P160 issues the GET command to the object storage system 230 through the API communication management function P1536 and acquires the result for the GET command (S5150).

Next, the storage management program P160 determines whether information about all new catalog data has been acquired (S5160). When it is determined that information about all new catalog data has not been acquired (No in S5160), the storage management program P160 makes the process proceed to step S5140.

On the other hand, when it is determined that information about all new catalog data has been acquired (Yes in S5160), the storage management program P160 specifies backup data based on all catalog data, updates the list of backup data, registers the updated date as the creation date (S5170), and ends the process.

Here, in this embodiment, even when a restore destination storage system of the logical volume is different from the storage system in which the logical volume is backed up, the logical volume can be restored. Specifically, in the restore destination storage system, by registering the object store in the same way as the one registered in the storage system in which the logical volume is backed up using the screens of FIGS. 8A and 8B, backup data of the logical volume backed up by another storage system can be selected as a restore target using the restore selection screen D40 of FIG. 17, and restore can be performed. In this case, since the original logical volume does not exist in the restore destination storage system, the original volume designation button D4041 is displayed in a non-selectable state, in the restore destination selection area D404 of the restore selection screen D40 of FIG. 17.

Next, the restore process is described.

Figure 19:
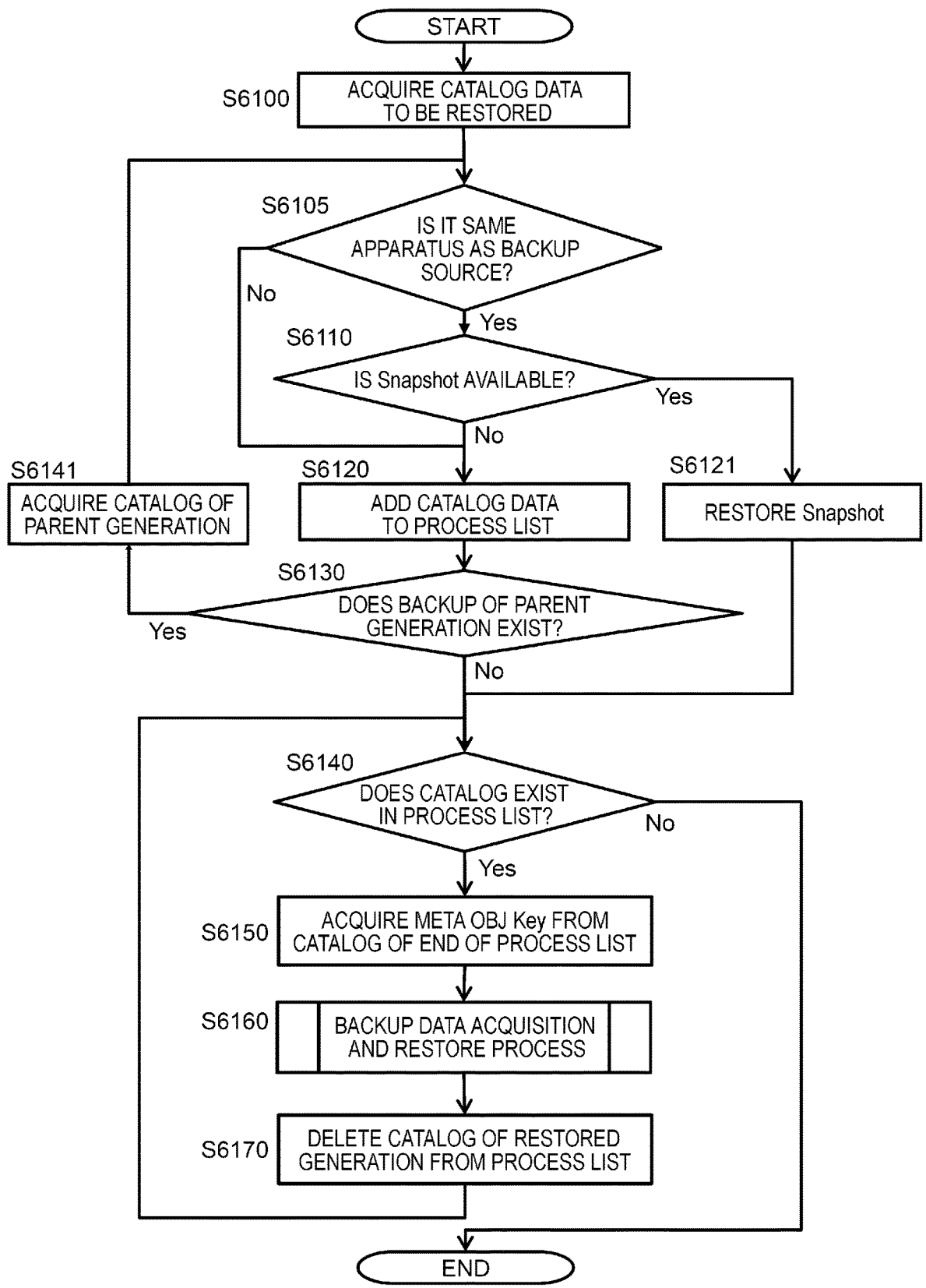
FIG. 19 is a flowchart of a restore process according to the first embodiment.

FIG. 19 is a flowchart of the restore process according to the first embodiment.

The restore process is executed by the storage management program P160 when the Restore button D411 is pressed on the restore selection screen D40. In the restore process, when a snapshot that was used to create the backup data remains in the storage system 10, data of the snapshot is used, and when the snapshot does not remain, backup data is acquired from the object store and restored.

First, the I/O control program P150 acquires catalog data corresponding to the backup data selected as a restore target (S6100).

Next, the I/O control program P150 refers to the logical volume number and snapshot generation number included in the catalog data, and determines whether the own storage system 10 of itself (its own storage system) to be the restore destination is the same as a backup source storage system in which the logical volume to be restored is backed up (step S6105).

As a result, when it is determined that its own storage system and the backup source storage apparatus are not the same (No in S6105), the I/O control program P150 makes the process proceed to step S6120.

On the other hand, when it is determined that its own storage system and the backup source storage apparatus are the same (Yes in S6105), the I/O control program P150 determines whether a snapshot of the logical volume corresponding to the acquired catalog data is available in its own storage system 10 (S6110).

Here, when it is determined that the snapshot of the logical volume corresponding to the catalog data is available in its own storage system 10, that is, when the snapshot exists and is available (Yes in S6110), since it means that the backup data used for restoration remains in the storage system 10 as the snapshot, the I/O control program P150 uses this snapshot to restore data to a restore destination logical volume (S6121), and makes the process proceed to step S6140. Specifically, the content (column) of the snapshot in the mapping table 400 is added to the mapping table 400 as the mapping information (column) of the restore destination logical volume. According to this process, since the data on the volume is not read or written, the process can be finished at high speed.

On the other hand, when it is determined that the snapshot of the logical volume corresponding to the catalog data is not available (No in S6110), since it is necessary to acquire the backup data from the object store of the cloud system 20, the I/O control program P150 makes the process proceed to step S6120.

In step S6120, the I/O control program P150 adds the catalog data to be processed to the process list managed by the restore planner P1537.

Next, the I/O control program P150 refers to the parent catalog object key T1616 of the catalog data and checks whether backup of the last generation (parent generation) exists (S6130).

As a result, when it is checked that the backup of the parent generation exists (Yes in S6130), since it is necessary to restore data based on the backup data of the parent generation first, the I/O control program P150 acquires catalog data of parent generation using the parent catalog object key (S6141), and makes the process proceed to step S6105. With this configuration, the process shown in steps S6105 to S6130 is executed. By doing as described above, the process list is in a state in which catalog data of the backup that should be restored in order of generation, starting from the catalog data at the end, is registered in the order of parent→child→grandchild.

In subsequent processing (steps S6140 to S6170), a restore process of data is performed using each of the catalog data registered in the process list.

In this restore process of data, the I/O control program P150 checks whether the catalog data exists in the process list (S6140).

As a result, when it is checked that the catalog data exists in the process list (Yes in S6140), the I/O control program P150 refers to the catalog data at the end of the process list, that is, the catalog data of the earliest generation, and acquires an object key of the metadata (S6150).

Next, the I/O control program P150 performs a backup data acquisition and restoration process (see FIG. 20) for acquiring an object of metadata corresponding to the object key from the object store 231, acquiring backup data based on the metadata, using the backup data, and restoring the data in the volume in that generation (point in time) (S6160).

Next, the I/O control program P150 deletes the catalog data of the generation processed in the backup data acquisition and restoration process from the process list (S6170), and makes the process proceed to step S6140. With this configuration, restoration is performed using each catalog data registered in the process list.

On the other hand, when it is checked that the catalog data does not exist in the process list (No in S6140), since it indicates that the restoration has been finished, the I/O control program P150 ends the process.

Next, the backup data acquisition and restoration process is described.

Figure 20:
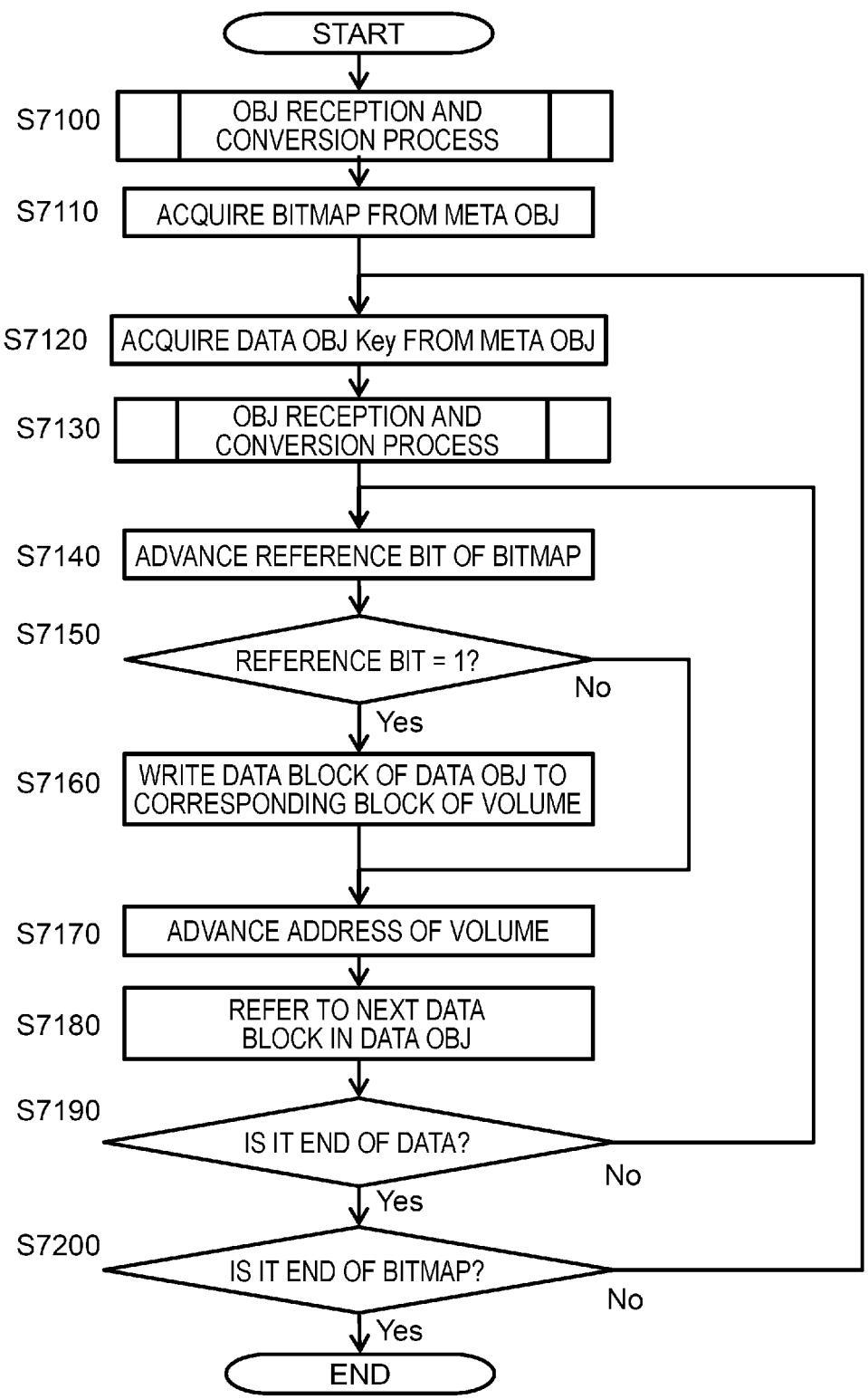
FIG. 20 is a flowchart of a backup data acquisition and restoration process according to the first embodiment.

FIG. 20 is a flowchart of the backup data acquisition and restoration process according to the first embodiment. The backup data acquisition and restoration process is a process for interpreting the acquired backup data based on the metadata and writing it to a restore destination volume.

The I/O control program P150 executes an object reception and conversion process (see FIG. 21) for acquiring the object from the object store for metadata based on the object key of the metadata stored in the catalog (for example, the object key of metadata object key T1615 in FIG. 16A), and converting the object into binary format (S7100).

Next, the I/O control program P150 extracts a bitmap from the acquired metadata (S7110). After that, the I/O control program P150 acquires the object key of the object to be processed next (referred to as a target object) of the backup data from the metadata (S7120), and executes an object reception and conversion process (see FIG. 21) for acquiring the object corresponding to the object key from the object store 231 and converting the object into binary format (S7130).

Next, the I/O control program P150 advances a bit to be referenced next (reference bit) in the bitmap acquired in step S7110 (S7140), and determines whether the reference bit is "1" (S7150).

As a result, when it is determined that the reference bit is "1" (Yes in S7150), since it means that data of a block with a block number corresponding to the reference bit exists in the data (partial backup data) obtained from the target object, the I/O control program P150 writes the data of the block included in the target object to a block with a corresponding block number of the restore destination volume (S7160).

On the other hand, when it is determined that the reference bit is not "1", that is, when it is "0" (No in S7150), since it means that the data of the block with the block number corresponding to the reference bit does not exist in the data obtained from the target object, the I/O control program P150 performs nothing, and makes the process proceed to step S7170.

In step S7170, the I/O control program P150 advances a block number of a write destination of the restore destination volume by one (S7170), and refers to a next block of the partial backup data (S7180).

Next, the I/O control program P150 determines whether the end of the data included in the partial backup data is reached, that is, whether the next block exists (S7190).

As a result, when it is determined that it is not the end of the partial backup data, that is, when the next block exists in the partial backup data obtained from the target object (No in S7190), since it indicates that data to be restored remains in the partial backup data, the I/O control program P150 makes the process proceed to S7140 and further executes the processes of steps S7140 to S7190 for the partial backup data.

On the other hand, when it is determined that the reference block does not exist in the partial backup data and the end of the data included in the partial backup data is reached (Yes in S7190), the I/O control program P150 determines whether the reference bit is the end of the bitmap (S7200).

As a result, when it is determined that the reference bit is not the end of the bitmap (No in S7200), since it means that the next partial backup data exists in other objects, the I/O control program P150 makes the process proceed to step S7120, and executes the processes of steps S7140 to S7190 for the next partial backup data.

On the other hand, when it is determined that the reference bit is the end of the bitmap (Yes in S7200), since it means that writing of all backup data has been finished, the I/O control program P150 ends the process.

Next, the object reception and conversion process is described.

Figure 21:
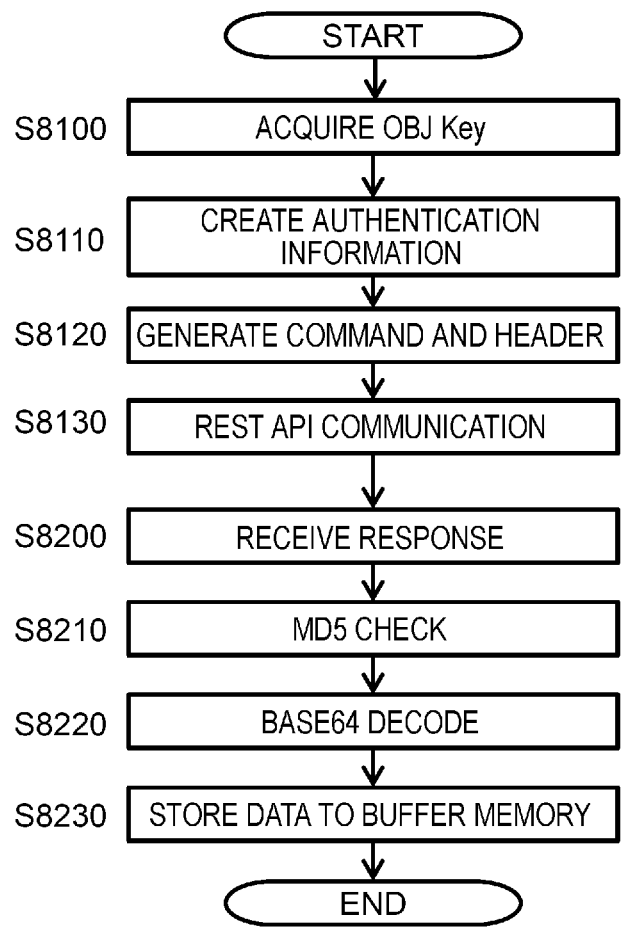
FIG. 21 is a flowchart of an object reception and conversion process according to the first embodiment.

FIG. 21 is a flowchart of the object reception and conversion process according to the first embodiment.

The object reception and conversion process is a process for acquiring an object (target object) of targeted data from the object store and converting the acquired object into binary data.

When the object key indicating the object of the targeted data is acquired (S8100), the I/O control program P150 specifies the access ID and secret key of the target object store from the registration information of the object store (information registered according to FIG. 8B), and performs a predetermined calculation using the access ID and secret key to create authentication information (S8110).

Next, the I/O control program P150 uses the API communication management function P1536 to construct a GET command with the authentication information, transmission date and time as an HTTP header (S8120), and requests the target object from the object store through REST API communication (S8130).

The I/O control program P150 receives a response including the object from the object store (S8200), and checks MD5 for the received data to see if there is any error in the data (S8210). Then, if there is no error in the data, the I/O control program P150 decodes the received data using, for example, BASE64 and converts it into binary data (S8220), copies the converted binary data to a memory area (buffer memory) for data storage (S8230), and ends the process.

Next, specific examples of the restore process are described with reference to FIGS. 22A to 22D.

Here, in FIGS. 22A to 22D, an example of a case in which a snapshot SS01, a snapshot SS02, and a snapshot SS03 are acquired in the storage system 10, and backup data BA01 corresponding to the snapshot SS01, backup data BA02 corresponding to the snapshot SS02, and backup data BA03 corresponding to the snapshot SS03 are stored in a bucket 2310 of the object store 231 by incremental backup when each snapshot is acquired, is described.

For example, assuming that the snapshot SS01 has data units "A", "B", and "C", the snapshot SS02 has data units "B", and "C", and the snapshot SS03 has data units "A'", "B'", and "C'", the backup data BA01 becomes to have data units "A", "B", and "C", the backup data BA02 becomes to have a data unit "A'", and the backup data BA03 becomes to have data units "B'" and "C'".

First, a first specific example will be described.

Figure 22A:
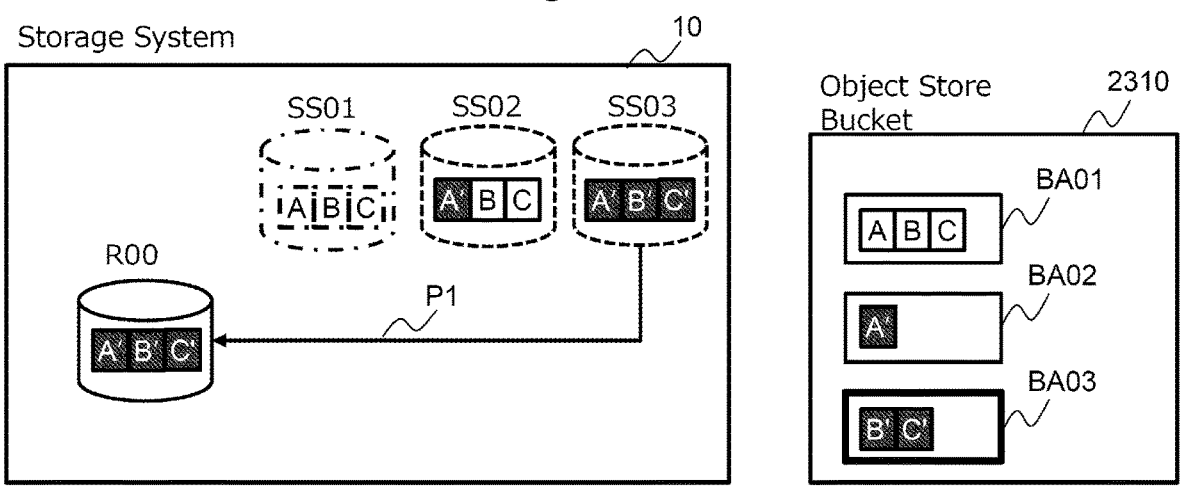
FIG. 22A is a diagram illustrating a first specific example of the restore process according to the first embodiment.

FIG. 22A is a diagram illustrating a first specific example of the restore process according to the first embodiment.

FIG. 22A illustrates an example in which, in the storage system 10, when the snapshot SS01 is deleted and the snapshots SS02 and SS03 exist, the volume corresponding to the snapshot SS03 of the third generation is restored to volume R00 as a restore target.

In this example, by executing the restore process illustrated in FIG. 19, the I/O control program P150 acquires catalog data corresponding to the backup data BA03 at a point in time to be restored (S6100), and checks whether the snapshot SS03 for the restore target volume in the storage system 10 is available based on this catalog data. In this example, the I/O control program P150 determines that the snapshot SS03 is available (Yes in S6110). As a result, the I/O control program P150 restores the volume R00 based on the snapshot SS03 (P1 in S6121). In this example, since no other catalog is registered in the process list (No in S6140), the I/O control program P150 completes the restore process.

According to this process, the volume corresponding to the snapshot of third generation can be quickly restored to the volume R00 of the storage system 10 without acquiring the backup data from the data store. Further, when a cost is incurred when acquiring data from the object store, an amount of data acquired from the object store can be reduced, and thus the data acquisition cost can be reduced.

Next, a second specific example will be described.

Figure 22B:
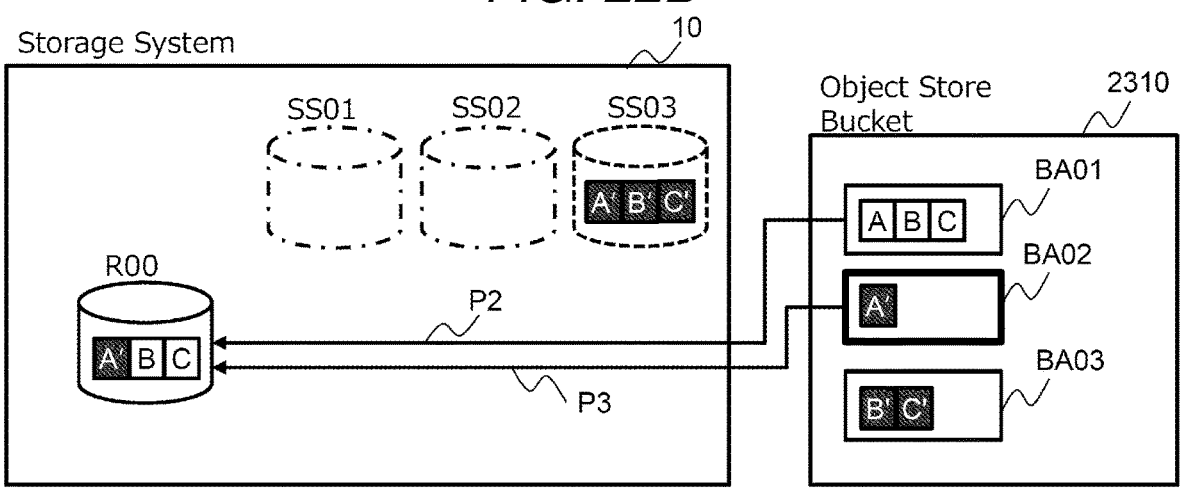
FIG. 22B is a diagram illustrating a second specific example of the restore process according to the first embodiment.

FIG. 22B is a diagram illustrating a second specific example of the restore process according to the first embodiment.

FIG. 22B illustrates an example in which, when the snapshots SS01 and SS02 are deleted and the snapshot SS03 exists in the storage system 10, the volume corresponding to the snapshot SS02 of the second generation is restored to the volume R00 as a restore target.

In this example, by executing the restore process illustrated in FIG. 19, the I/O control program P150 acquires catalog data corresponding to the backup data BA02 at a point in time to be restored (S6100), and checks whether the snapshot SS02 for the volume to be restored in the storage system 10 is available based on this catalog data. In this example, the I/O control program P150 determines that the snapshot SS02 is not available (No in S6110), and adds catalog data corresponding to the backup data BA02 to the process list. Next, since the backup data BA01 of the parent generation exists in the backup data BA02 (Yes in S6130), the I/O control program P150 acquires catalog data of the backup data BA01 and checks a corresponding snapshot. As a result, since the corresponding snapshot SS01 does not exist, the I/O control program P150 adds the catalog data of the backup data BA01 to the process list. After that, since the catalog data of the backup data BA01 and the backup data BA02 exist in the process list, the I/O control program P150 executes the processing of steps S6150 to S6170, and uses the catalog data and metadata of the backup data BA01 to perform a process P2 for restoring the volume R00 to the volume R00 which is in a state of being the first generation. Next, the I/O control program P150 uses the catalog data and metadata of the backup data BA02 to perform a process P3 for restoring the volume R00 to the volume R00 which is in a state of being the second generation.

According to this process, the volume corresponding to the snapshot of the second generation can be restored to the volume R00 of the storage system 10.

Next, a third specific example will be described.

Figure 22C:
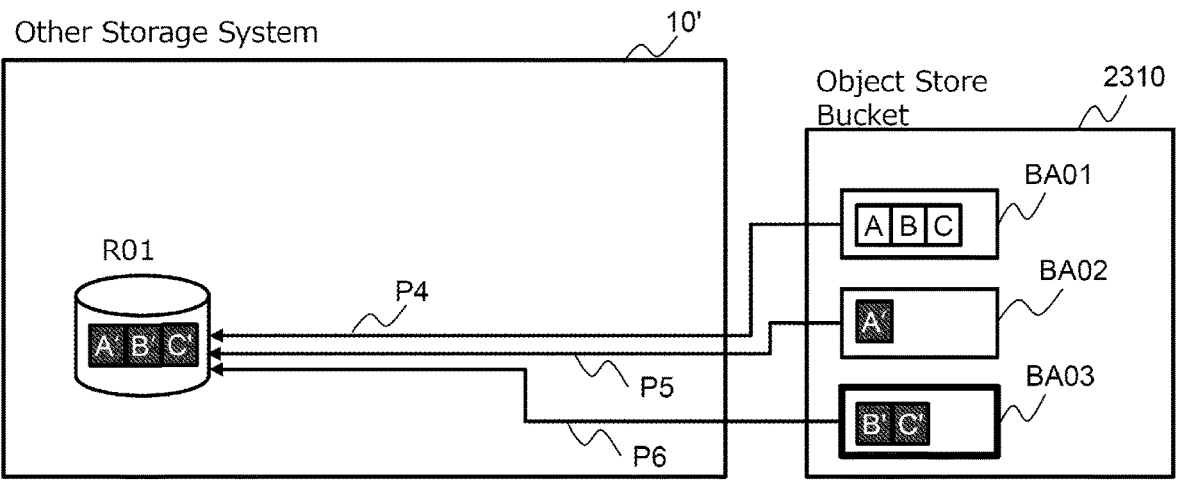
FIG. 22C is a diagram illustrating a third specific example of the restore process according to the first embodiment.

FIG. 22C is a diagram illustrating a third specific example of the restore process according to the first embodiment.

FIG. 22C illustrates an example in which, in a storage system 10' which is different from the storage system 10 and does not have a snapshot of the volume to be restored, a volume corresponding to the snapshot SS03 of the third generation is restored to the volume R01 as the restore target.

In this example, since snapshots do not exist in the storage system 10', by executing the restore process illustrated in FIG. 19, the I/O control program P150 adds the catalog data of the backup data BA03, BA02, and BA01 to the process list (S6120). As a result, the I/O control program P150 executes the processing of steps S6150 to S6170, uses the catalog data and metadata of the backup data BA0 to perform a process P4 for restoring the volume R00 to the volume R00 which is in a state of being the first generation, next, the I/O control program P150 uses the catalog data and metadata of the backup data BA02 to perform a process P5 for restoring the volume R00 to the volume R00 which is in a state of being the second generation, and next, the I/O control program P150 uses the catalog data and metadata of the backup data BA03 to performs a process P6 for restoring the volume R00 to the volume R00 which is in a state of being the third generation.

According to this process, since the metadata and catalog data of the backup data are also stored in the object store together with the backup data and these data can be used, a desired volume can be properly restored even for a storage system that does not have backups.

Next, a fourth specific example will be described.

Figure 22D:
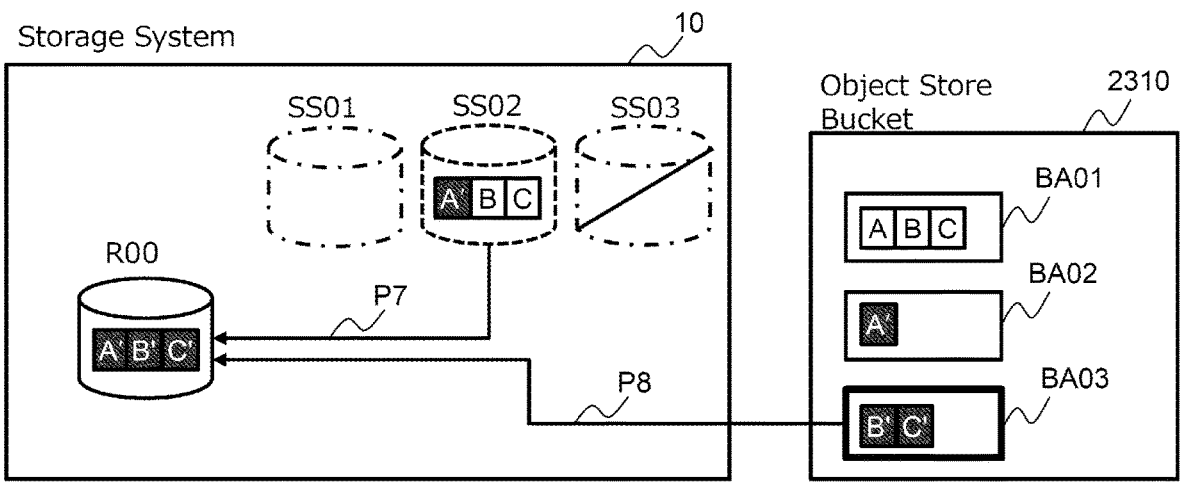
FIG. 22D is a diagram illustrating a fourth specific example of the restore process according to the first embodiment.

FIG. 22D is a diagram illustrating a fourth specific example of the restore process according to the first embodiment.

FIG. 22D illustrates an example in which, in the storage system 10, the volume corresponding to the snapshot SS03 of the third generation is restored to volume R00 as a restore target when the snapshot SS01 is deleted and snapshots SS02 and SS03 exist but the snapshot SS03 is in an unavailable state for some reason.

In this example, since the snapshot SS03 corresponding to the backup data BA03 is in an unavailable state, the I/O control program P150 adds the catalog data of the backup data BA03 to the process list by executing the restore process illustrated in FIG. 19 (S6120). Next, since the backup data BA02 as the parent generation exists, the I/O control program P150 acquires catalog data corresponding to the backup data BA02 (S6141). Since the snapshot SS02 corresponding to the backup data BA02 is available in the storage system 10, the I/O control program P150 restores the volume R0 to the volume R00 which is in a state of being the second generation by restoring the snapshot SS02 to the volume R00 (P7 in S6121). Next, the I/O control program P150 executes the processing of steps S6150 to S6170, and uses the catalog data and metadata of the backup data BA03 to perform a process P8 for restoring the volume R00 to the volume R00 which is in a state of being the third generation.

According to this process, even when the storage system 10 does not store a snapshot (first point-in-time snapshot) corresponding to the volume to be restored, when a snapshot of an earlier generation (second point-in-time snapshot) associated with that volume is stored, it is sufficient to use that snapshot to acquire backup data of subsequent generations (subsequent incremental data) from the data store, it is not necessary to receive and restore backup data of all generations from the data store, and volumes to be restored can be restored appropriately and quickly. Further, when a cost is incurred when acquiring data from the object store, since the amount of data acquired from the object store can be reduced, the data acquisition cost can be reduced.

Next, a modification of the computer system according to the first embodiment is described.

In the computer system 1 according to the first embodiment, although all of objects of backup data, and metadata and catalog data related to backup data were stored in the object store 231 of the object storage system 230, for example, the catalog data may be stored in the database system 220 of the cloud system 20 as a catalog data table and managed.

FIG. 23 is a configuration diagram of a catalog data table according to a modification of the first embodiment.

A catalog data table T1000 stores a record (entry) for each catalog. The record of the catalog data table T1000 includes fields for a key T1001, an apparatus product number T1002, a backup volume number T1003, a Volume usage/provisioning size T1004, a Snapshot generation number T1005, a Snapshot acquisition date and time T1006, a metadata object key T1007, and a parent catalog key T1008.

The key T1001 stores an identification name (key) of the catalog data. The apparatus product number T1002 stores an apparatus product number of the storage system 10. The backup volume number T1003 stores a volume number for identifying a logical volume to be backed up. The Volume usage/provisioning size T1004 stores a provisioning size (allocation capacity) and used size of the logical volume to be backed up. The Snapshot generation number T1005 stores a generation number of a snapshot corresponding to the catalog data. The Snapshot acquisition date and time T100 stores the acquisition date and time of the snapshot corresponding to the catalog data. The metadata object key T1007 stores an object key indicating an object by which metadata corresponding to the catalog data is checked. The parent catalog key T1008 stores an identification name (key) indicating catalog data during backup of the parent generation (last generation).

In this catalog data table T1000, the catalog data in the object format shown in FIGS. 16A and 16B are respectively managed as records.

In the storage system according to the modification, a plurality of pieces of catalog data may be acquired by issuing a NoSQL command once to the database system 220 without performing the process illustrated in FIG. 18 as the backup list acquisition process. Therefore, the backup list acquisition process can be performed quickly. In the storage system according to the modification, it is not necessary to perform object conversion or inverse conversion of catalog data in the backup process and the restore process.

Next, a computer system according to a second embodiment will be described.

The computer system according to the second embodiment does not directly set the selection of the backup method, but automatically selects a full backup or an incremental backup in consideration of the charges related to the object store service or the time required for restoration. In the second embodiment, the description will be made mainly on the differences from the first embodiment, and duplicate descriptions may be omitted.

FIG. 24 is a diagram illustrating a backup schedule setting screen according to the second embodiment.

The backup schedule setting screen D31 includes a backup policy setting area D305 and a deletion policy setting area D306, instead of the backup method selection area D304, in contrast to the backup schedule setting screen D30 of the first embodiment illustrated in FIG. 10.

The backup policy setting area D305 is an area for selecting a backup policy. The backup policy setting area D305 includes, as a method of selecting a full backup or an incremental backup, a time-based selection button D3051 for selecting a time-based method, a cost-based selection button D3052 for selecting a restoration cost-based method, and a threshold setting area D3053 for setting a threshold used for selection.

In a case where the time-based selection button D3051 is selected, when the full backup time is set to 1.0, a new full backup is performed when the total time of the full backup and incremental backup exceeds a threshold (threshold of the setting area D3053), and otherwise, the incremental backup is performed. This backup method is suitable when the backup time or the restoration time is desired to be equal to or less than a fixed value.

In a case where the cost-based selection button D3052 is selected, when the estimated restoration cost for the full backup is set to 1.0, a new full backup is performed when the total estimated restoration cost for the full backup and the incremental backup exceeds a threshold (threshold of the setting area D3053), and otherwise, the incremental backup is performed. This backup method is suitable when the cost during restoration is desired to be equal to or less than a fixed value.

The deletion policy setting area D306 is an area for selecting a policy for handling deletion of an old backup data set. Here, the old backup data set means a backup data group of the full backup and the incremental backup before a new full backup when the new full backup is taken.

The deletion policy setting area D306 includes an old backup data set delete selection button D3061 and an old backup data set archive selection button D3062. When the old backup data set delete selection button D3061 is selected, the storage system 10 deletes the old backup data set. When the old backup data set archive selection button D3062 is selected, the storage system 10 moves the old backup data set to an archive tier of the object store.

Next, a backup process by the storage system according to the second embodiment is described.

FIG. 25 is a flowchart of the backup process according to the second embodiment. It should be noted that portions similar to those of the backup process according to the first embodiment illustrated in FIG. 11 are denoted by the same reference numerals, and duplicate descriptions thereof may be omitted.

When an operation instruction is received from the backup management function P1670, the I/O control program P150 acquires a snapshot of the logical volume to be backed up (target logical volume) using the Point-in-Time copy function P1530 (S2100).

Next, the I/O control program P150 checks a set backup policy (S2101).

When the backup policy is designated based on the backup time (Time-based in S2101), the I/O control program P150 calculates a Ratio by dividing the total backup time by the time required for a previous full backup (S2102), and makes the process proceed to step S2104.

On the other hand, when the backup policy is designated based on an estimated restoration cost (Cost-based in S2101), the I/O control program P150 calculates the Ratio by dividing the maximum restoration cost, that is, the cost of restoring a full backup and all previous incremental backups, by the estimated restoration cost of a previous full backup (S2103), and makes the process proceed to step S2104.

In step S2104, the I/O control program P150 determines whether the Ratio exceeds a set threshold. As a result, when it is determined that the Ratio exceeds the threshold (Yes in S2104), the I/O control program P150 sets the full backup as the backup method (S2105). On the other hand, when the Ratio does not exceed the threshold (No in S2104), the I/O control program P150 sets the incremental backup as the backup method (S2106).

Next, the I/O control program P150 executes the processing of steps S2110 to S2230.

Next, the I/O control program P150 calculates the time required for the current backup (S2231). The time required for the current backup can be obtained by measuring the time required for steps S2130 to S2230 in advance.

Next, the I/O control program P150 acquires a capacity of the object store consumed by the current backup and the number of transferred objects (S2232), and calculates a cost required for restoration based on the capacity and the number of objects (S2233). Specifically, the I/O control program P150 obtains a transfer cost by multiplying the consumed capacity of the object store by a transfer capacity unit price, and obtains a request cost by multiplying the number of transferred objects by a request unit price, and totals them to calculate the cost. When other charges are incurred by the cloud service provider, they should also be taken into account.

Next, the I/O control program P150 updates the total backup time by adding the time required for the current backup to the total backup time up to the last backup, and updates the maximum restoration cost by adding the calculated cost to the maximum restoration cost (S2234). If the current backup is a full backup, the I/O control program P150 updates the full backup time and full backup restoration cost (S2235). Subsequent processing is the same as that in the backup process illustrated in FIG. 11.

Next, an old backup set disposal process by the storage system according to the second embodiment is described.

FIG. 26 is a flowchart of an old backup set disposal process according to the second embodiment. The old backup set disposal process is executed in cooperation between the I/O control program P150 and the backup management function P1670 of the storage management program P160, for example, when a full backup is performed in the backup process illustrated in FIG. 25.

The backup management function P1670 acquires catalog data (catalog data group) for past backup data by the same method as in FIG. 18 (S9100). Next, the backup management function P1670 traces parent generations in order from the catalog data of the previous backup, thereby specifying the backup group whose parent is the previous full backup as a backup group to be disposed of, which are to be deleted or archived (S9110), and passes the catalog data of the backup groups to be disposed of and the object keys of the catalog data to the I/O control program P150.

Next, the I/O control program P150 refers to each passed catalog data and acquires an object key of an object of metadata corresponding to backup data which corresponds to each catalog data (S9120). Next, the I/O control program P150 acquires metadata using the acquired object key, and acquires one or more object keys (object key group) of one or more objects of the backup data stored in the metadata (S9130). By the processing described above, a set of catalog data, metadata, and backup data to be disposed of can be specified.

Next, the I/O control program P150 checks setting of a deletion policy (S9140), uses the acquired object key group to delete the metadata and the objects of backup data corresponding to the acquired object key group from the object store 231 (S9200), and deletes the corresponding catalog data group from the object store 231 (S9210) when it is checked that the deletion policy is set as deletion (Delete in S9140), and ends the process.

On the other hand, when the deletion policy is set as archival (Archive in S9140), the I/O control program P150 uses the acquired object key group to move the metadata and the objects of backup data corresponding to the acquired object key group to an archive tier of the object store 231 (S9300) and rewrite the object key of the metadata of each catalog data so as to point to the object of the metadata of the archive tier so that it can be seen that these data have been moved to the archive tier (S9310), and ends the process.

According to the above process, old backup sets stored in the object store can be properly disposed of.

It should be noted that the present invention is not limited to the embodiments described above, and can be appropriately modified and implemented without departing from the scope of the present invention.

For example, in the embodiments described above, part or all of the processes performed by the processor may be performed by a hardware circuit. Further, the programs in the embodiments described above may be installed from a program source.

The program source may be a program distribution server or storage media (for example, portable storage media).

What is claimed is:

1. A data control apparatus that is connected via a network to a cloud system, which provides an object store, and backs up differential data among a plurality of snapshots of a predetermined volume having a plurality of data as objects of the object store, the data control apparatus comprising:
a processor,
wherein the processor is programmed to:
when backing up the predetermined volume,
generate back up data stored in the object store, catalog information including identification information of the predetermined volume and a snapshot as a comparison source according to the backup data, and metadata including difference existence information showing data existence within backup data, in each address of the predetermined volume,
store the backup data, the catalog information, and the metadata as objects to the object store, and
when restoring the backed up predetermined volume, based on the catalog information, specify the object to be used for restoration, based on bitmap information of the metadata, selectively perform whether to perform data restoration from the backup data for each address of the restoration destination volume, and
for each address showing that the bitmap information has a difference, perform data restoration using backup data according to the catalog information of the bitmap information, and for each address showing that the bitmap information has no difference, perform data restoration using another backup data including backup data according to the comparison source snapshot of the backup data.

2. The data control apparatus according to claim 1, wherein the processor is configured to specify the object to be used for restoration based on the snapshot of the comparison source of the catalog information when restoring the backed up predetermined volume.

3. The data control apparatus according to claim 2, wherein the processor of the data control apparatus is configured to:
selectively use a plurality of predetermined back up methods among a full back up method regarding dummy data as the other snapshot, incremental back up method regarding a previous backed up snapshot as the other snapshot, and a differential back up method using predetermined snapshot as the other snap shot by plural times.

4. The data control apparatus according to claim 3, wherein catalog information according to the incremental back up and the differential back up has identification information of snapshot of the comparison source and catalog information according to the full back up does not have identification information of snapshot of the comparison source, and
wherein specification of object to be used for restoration based on snapshot of the comparison source of the catalog information is performed until identification information of snapshot of the comparison source is exhausted.

5. The data control apparatus according to claim 2, wherein the processor is configured to restore volumes of restoration target by designating generation of a snapshot and based on the designated generation, the catalog information, and differential existence information of the metadata, and select backup data to be used for the restoration.

6. The data control apparatus according to claim 5, wherein the processor is configured to:
receive a designation of a volume to be restored, and
acquire catalog information related to the volume to be restored from the object store and cause a candidate generation for restoring the volume to be restored to be selectively displayed based on the catalog information.

7. The data control apparatus according to claim 3, wherein the processor is configured to select the backup method based on a back up time or a back up cost.

8. The data control apparatus according to claim 1, wherein the processor is configured to:
receive an instruction to register an object store for storing a backup of the volume,
determine whether the instructed object store is accessible by actually accessing the object store, and
when it is determined that the object store is accessible, register the object store as the object store for storing the backup of the volume.

9. A data control method by a data control apparatus that is connected via a network to a cloud system, which provides an object store, and backs up differential data among a plurality of snapshots of a predetermined volume having a plurality of data as objects of the object store, wherein the data control apparatus executes steps comprising:
when backing up the predetermined volume, generating back up data stored in the object store, cataloging information including identification information of the predetermined volume and a snapshot of comparison source according to the backup data, and metadata including difference existence information showing data existence within backup data, in each address of the predetermined volume;
storing the backup data, the catalog information and the metadata as objects to the object store; and
when restoring the backed up predetermined volume, based on the catalog information, specifying the object to be used for restoration, based on bitmap information of the metadata, selectively performing whether to perform data restoration from the backup data for each address of the restoration destination volume; and
for each address showing that the bitmap information has a difference, performing data restoration using backup data according to the catalog information of the bitmap information, and for each address showing that the bitmap information has no difference, performing data restoration using another backup data including backup data according to the comparison source snapshot of the backup data.

\* \* \* \* \*